US012720090B2

(12) United States Patent
Johnson

(10) Patent No.: US 12,720,090 B2
(45) Date of Patent: Aug. 25, 2026

(54) METHODS, APPARATUSES, COMPUTER PROGRAMS AND COMPUTER-READABLE MEDIA FOR SCALABLE IMAGE CODING

(71) Applicant: V-NOVA INTERNATIONAL LIMITED, London (GB)

(72) Inventor: Robert Johnson, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 0 days.

(21) Appl. No.: 18/733,408

(22) Filed: Jun. 4, 2024

(65) Prior Publication Data

US 2024/0406423 A1 Dec. 5, 2024

Related U.S. Application Data

(63) Continuation of application No. 18/314,006, filed on May 8, 2023, now Pat. No. 12,003,742, which is a (Continued)

(30) Foreign Application Priority Data

Oct. 31, 2018 (GB) ..................................... 1817784

(51) Int. Cl.
*H04N 19/36* (2014.01)
*H04N 19/132* (2014.01)
(Continued)

(52) U.S. Cl.
CPC ........... *H04N 19/36* (2014.11); *H04N 19/132* (2014.11); *H04N 19/184* (2014.11); *H04N 19/31* (2014.11);
(Continued)

(58) Field of Classification Search
CPC .... H04N 19/36; H04N 19/132; H04N 19/184; H04N 19/31; H04N 19/70; H04N 19/187;
(Continued)

(56) References Cited

U.S. PATENT DOCUMENTS 10,652,560 B2 5/2020 Rossato et al.
2007/0286283 A1* 12/2007 Yin ........................ H04N 19/70 375/E7.199
(Continued)

FOREIGN PATENT DOCUMENTS

CN 101040533 A 9/2007
CN 103875245 A 6/2014
(Continued)

OTHER PUBLICATIONS

Anonymous, "Scalable HEVC Encoding: how to setup cfg files for quality scalability?—stack overflow", Jun. 26, 2017, XP055660374, retrieved from the internet, URL: https://stackoverflow.com/questions/44203320/scalable-hevc-encoding-how-to-setup-cfg-files-for-quality-scalability [retrieved on Jan. 21, 2020].
(Continued)

*Primary Examiner* — Richard T Torrente
(74) *Attorney, Agent, or Firm* — Workman Nydegger

(57) ABSTRACT

For each image in a set of images, a representation of the image at a first level of quality is derived using a first representation of the image at a second, higher level of quality and is output for processing by a decoder. Configuration data is output for processing by the decoder to enable the decoder to detect whether or not the first representation of a given image in the set of images is to be reconstructed using residual data for the given image, the residual data: (i) being useable to reconstruct the first representation using a second representation of the image at the second level of quality, the second representation being based on the rep-
(Continued)

resentation of the image at the first level of quality, and (ii) being derived based on the first representation and the second representation.

12 Claims, 13 Drawing Sheets

Related U.S. Application Data continuation of application No. 17/290,474, filed as application No. PCT/GB2019/053069 on Oct. 30, 2019, now Pat. No. 11,671,610.

(51) Int. Cl.

| | |
|---|---|
| ***H04N 19/184*** | (2014.01) |
| ***H04N 19/31*** | (2014.01) |
| ***H04N 19/70*** | (2014.01) |
| *H04N 19/169* | (2014.01) |
| *H04N 19/187* | (2014.01) |
| *H04N 19/30* | (2014.01) |
| *H04N 19/34* | (2014.01) |

(52) U.S. Cl.

CPC ........... *H04N 19/70* (2014.11); *H04N 19/187* (2014.11); *H04N 19/1883* (2014.11); *H04N 19/30* (2014.11); *H04N 19/34* (2014.11)

(58) Field of Classification Search

CPC .... H04N 19/1883; H04N 19/30; H04N 19/34; H04N 19/33; H04N 19/463

See application file for complete search history.

(56) References Cited

U.S. PATENT DOCUMENTS

| | | | | |
|---|---|---|---|---|
| 2009/0010333 | A1* | 1/2009 | Tourapis ................ | H04N 19/70 375/E7.199 |
| 2010/0020866 | A1 | 1/2010 | Marpe et al. | |
| 2012/0183065 | A1 | 7/2012 | Rusert et al. | |
| 2013/0034170 | A1* | 2/2013 | Chen .............. | H04N 21/234381 375/E7.026 |
| 2013/0294495 | A1 | 11/2013 | Rossato et al. | |
| 2013/0294704 | A1* | 11/2013 | Rossato ................. | H04N 19/33 382/232 |
| 2013/0297466 | A1 | 11/2013 | Rossato et al. | |
| 2014/0064364 | A1 | 3/2014 | Wang et al. | |
| 2014/0301453 | A1 | 10/2014 | Deshpande | |
| 2016/0014422 | A1 | 1/2016 | Su et al. | |
| 2020/0329284 | A1 | 10/2020 | Denoual | |

FOREIGN PATENT DOCUMENTS

| | | | |
|---|---|---|---|
| CN | 105580369 | A | 5/2016 |
| EP | 2428042 | A1 | 3/2012 |
| WO | 2013-011492 | | 1/2013 |
| WO | 2013/160277 | A1 | 10/2013 |
| WO | 2018-046940 | | 3/2018 |

OTHER PUBLICATIONS

International Search Report and Written Opinion for PCT/GB2019/053069 mailed on Apr. 1, 2020.

Rosewarne et al., "High Efficiency Video Coding (HEVC) Test Model 16 (HM 16) Update 2 of Encoder Description", 20, JCT-VC Meeting; Feb. 10, 2015 to Feb. 18, 2015, Geneva, Joint Collaborative Team on Video Coding of ISO/IEC JTC1/SC29/WG11 and ITU-T SG.16), URL: http:/WFTP3.ITU.INT/AV-ARCH/JCTVC-SITE/, No. JCTVC-T1002, Jun. 2, 2015, XP030117409.

U.S. Appl. No. 17/290,474, Feb. 15, 2022, Office Action.

U.S. Appl. No. 17/290,474, Aug. 16, 2022, Office Action.

Final Office Action received for U.S. Appl. No. 17/290,474, mailed on Aug. 16, 2022, 10 pages.

Notice of Allowance received for U.S. Appl. No. 17/290,474, mailed on Jan. 25, 2023, 5 pages.

Office Action received for U.S. Appl. No. 17/290,474, mailed on Feb. 15, 2022, 11 pages.

* cited by examiner

Message Type 712

Header Part 710

Payload Size 714

Payload Part 720

Transform Type 751

Upsample Type 752

Depth Type 753

Temporal Processing 754

Resolution Type 755

Custom Resolution 756

METHODS, APPARATUSES, COMPUTER PROGRAMS AND COMPUTER-READABLE MEDIA FOR SCALABLE IMAGE CODING

CROSS-REFERENCE TO RELATED APPLICATIONS

The present application is a continuation of U.S. patent application Ser. No. 18/314,006, filed May 8, 2023, which is a continuation of U.S. patent application Ser. No. 17/290,474, filed Apr. 30, 2021, which is a 371 US National Stage Entry of PCT/GB2019/053069, filed Oct. 30, 2019, which claims priority to UK Patent Application No. 1817784.0, filed Oct. 31, 2018, the entire disclosures of which are incorporated herein by reference.

TECHNICAL FIELD

This invention relates to methods, apparatuses, computer programs and computer-readable media. In particular, but not exclusively, this invention relates to methods, apparatuses, computer programs and computer-readable media for use in the processing of configuration information that relates to residual data useable to reconstruct a representation of an image at a relatively high level of quality.

BACKGROUND

Compression and decompression of signals is a consideration in many known systems. Many types of signal, for example video, may be compressed and encoded for transmission, for example over a data communications network. When such a signal is decoded, it may be desired to increase a level of quality of the signal and/or recover as much of the information contained in the original signal as possible.

Some known systems exploit scalable encoding techniques. Scalable encoding involves encoding a signal along with information to allow the reconstruction of the signal at one or more different levels of quality, for example depending on the capabilities of the decoder and the available bandwidth.

There are several considerations relating to the reconstruction of signals in a scalable encoding system. One such consideration is the amount of information that is stored, used and/or transmitted. The amount of information may vary, for example depending on the desired level of quality of the reconstructed signal, the nature of the information that is used in the reconstruction, and/or how such information is configured.

Another consideration is the ability of the decoder to process received information accurately and/or reliably. One factor that may affect the reliability of the decoder is the ability of the decoder to handle errors and/or to handle received information that is unexpected, modified and/or unrecognized by the decoder. Another factor in the accuracy and/or the reliability with which the decoder is able to perform reconstruction relates to providing the decoder with up-to-date information indicating how the signal is to be reconstructed.

Another consideration is the ability of the encoder and/or the decoder to process information efficiently. The efficiency with which the encoder and/or the decoder processes information may be a factor in the performance level of the encoder and/or the decoder.

SUMMARY

Various aspects of the present invention are set out in the appended claims.

Further features and advantages will become apparent from the following description of preferred embodiments, given by way of example only, which is made with reference to the accompanying drawings.

DETAILED DESCRIPTION

Figure 1:
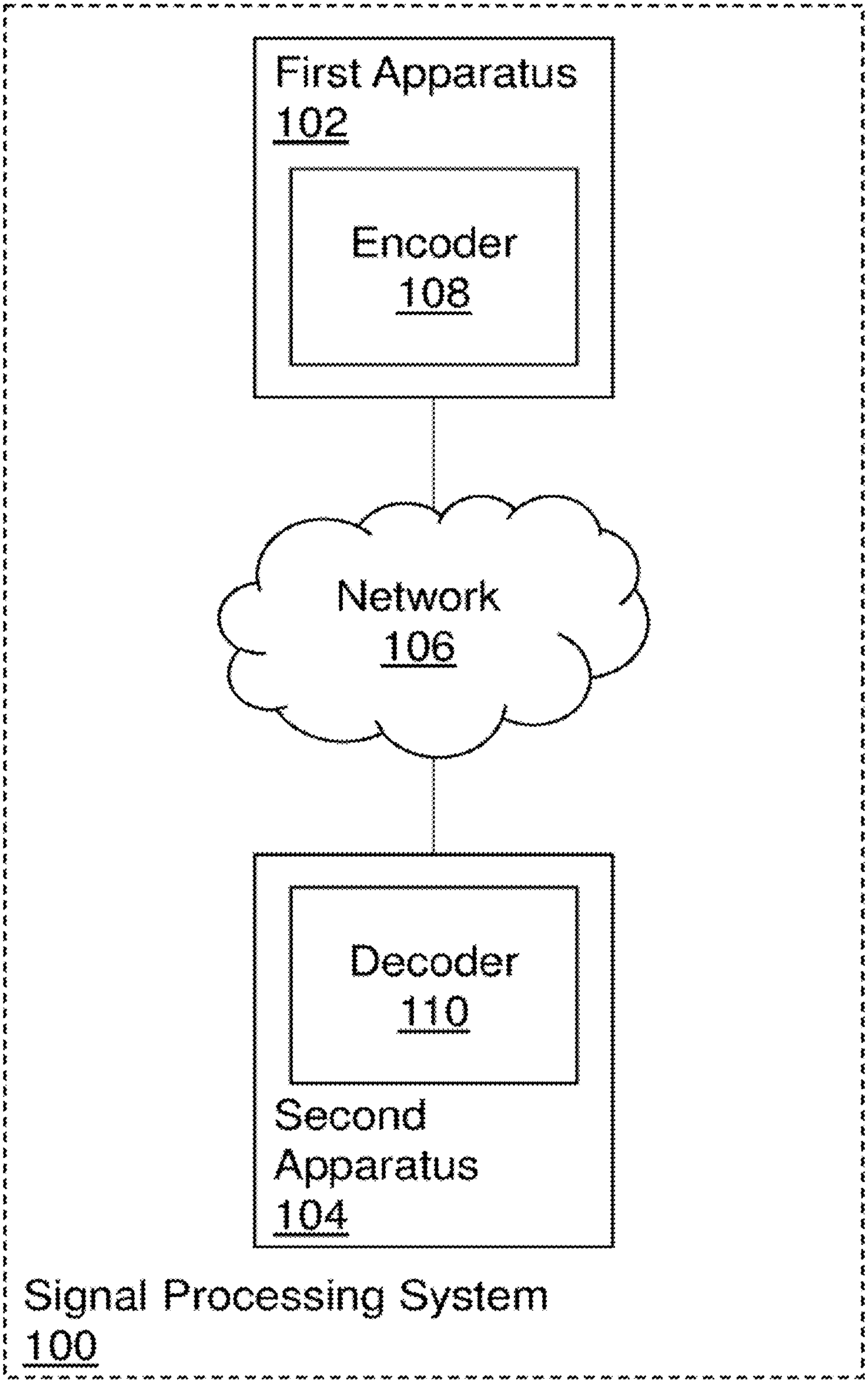
FIG. 1 shows a schematic block diagram of an example of a signal processing system in accordance with an embodiment of the present invention.

Referring to FIG. 1, there is shown an example of a signal processing system 100. The signal processing system 100 is used to process signals. Examples of types of signal include, but are not limited to, video signals, image signals, audio signals, volumetric signals such as those used in medical, scientific or holographic imaging, or other multidimensional signals.

The signal processing system 100 includes a first apparatus 102 and a second apparatus 104. The first apparatus 102 and second apparatus 104 may have a client-server relationship, with the first apparatus 102 performing the functions of a server device and the second apparatus 104 performing the functions of a client device. The signal processing system 100 may include at least one additional apparatus (not shown). The first apparatus 102 and/or second apparatus 104 may comprise one or more components. The one or more components may be implemented in hardware and/or software. The one or more components may be co-located or may be located remotely from each other in the signal processing system 100. Examples of types of apparatus include, but are not limited to, computerised devices, handheld or laptop computers, tablets, mobile devices, games consoles, smart televisions, set-top boxes, augmented and/or virtual reality headsets etc.

The first apparatus 102 is communicatively coupled to the second apparatus 104 via a data communications network 106. Examples of the data communications network 106 include, but are not limited to, the Internet, a Local Area Network (LAN) and a Wide Area Network (WAN). The first and/or second apparatus 102, 104 may have a wired and/or wireless connection to the data communications network 106.

The first apparatus 102 comprises an encoder 108. The encoder 108 is configured to encode data comprised in the signal, which is referred to hereinafter as “signal data”. For example, where the signal is a video signal, the encoder 108 is configured to encode video data. Video data comprises a sequence of multiple images or frames. The encoder 108 may perform one or more further functions in addition to encoding signal data. The encoder 108 may be embodied in various different ways. For example, the encoder 108 may be embodied in hardware and/or software.

Although in this example the first apparatus 102 comprises the encoder 108, in other examples the first apparatus 102 is separate from the encoder 108. In such examples, the first apparatus 102 is communicatively coupled to the encoder 108. The first apparatus 102 may be embodied as one or more software functions and/or hardware modules.

The second apparatus 104 comprises a decoder 110. The decoder 110 is configured to decode signal data. The decoder 110 may perform one or more further functions in addition to decoding signal data. The decoder 110 may be embodied in various different ways. For example, the decoder 110 may be embodied in hardware and/or software.

Although in this example the second apparatus 104 comprises the decoder 110, in other examples, the second apparatus 104 is separate from the decoder 110. In such examples, the second apparatus 104 is communicatively coupled to the decoder 110. The second apparatus 104 may be embodied as one or more software functions and/or hardware modules.

The encoder 108 encodes signal data and transmits the encoded signal data to the decoder 110 via the data communications network 106. The decoder 110 decodes the received, encoded signal data and generates decoded signal data. The decoder 110 may output the decoded signal data, or data derived using the decoded signal data. For example, the decoder 110 may output such data for display on one or more display devices associated with the second apparatus 104.

In some examples described herein, the encoder 108 transmits to the decoder 110 a representation of a signal at a given level of quality and information the decoder 110 can use to reconstruct a representation of the signal at one or more higher levels of quality. Such information may be referred to as “reconstruction data”. In some examples, “reconstruction” of a representation involves obtaining a representation that is not an exact replica of an original representation. The extent to which the representation is the same as the original representation may depend on various factors including, but not limited to, quantisation levels. A representation of a signal at a given level of quality may be considered to be a rendition, version or depiction of data comprised in the signal at the given level of quality. In some examples, the reconstruction data is included in the signal data that is encoded by the encoder 108 and transmitted to the decoder 110. For example, the reconstruction data may be in the form of metadata. In some examples, the reconstruction data is encoded and transmitted separately from the signal data.

The information the decoder 110 uses to reconstruct the representation of the signal at the one or more higher levels of quality may comprise residual data, as described in more detail below. Residual data is an example of reconstruction data. The information the decoder 110 uses to reconstruct the representation of the signal at the one or more higher levels of quality may also comprise configuration data relating to processing of the residual data. The configuration data may indicate how the residual data has been processed by the encoder 108 and/or how the residual data is to be processed by the decoder 110. The configuration data may be signaled to the decoder 110, for example in the form of metadata.

Figure 2A:
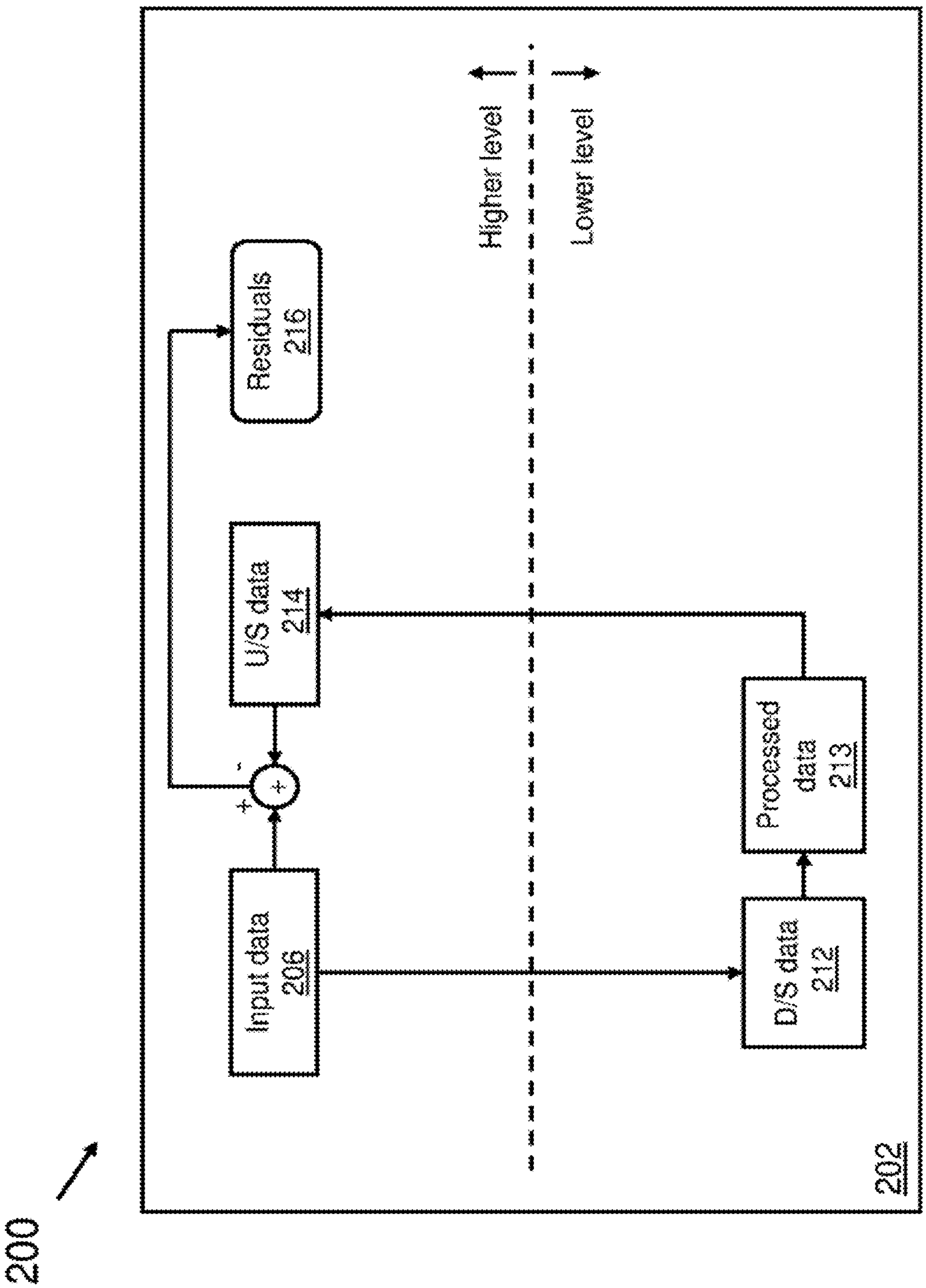
FIGS. 2A and 2B show a schematic block diagram of another example of a signal processing system in accordance with an embodiment of the present invention.
Figure 2B:
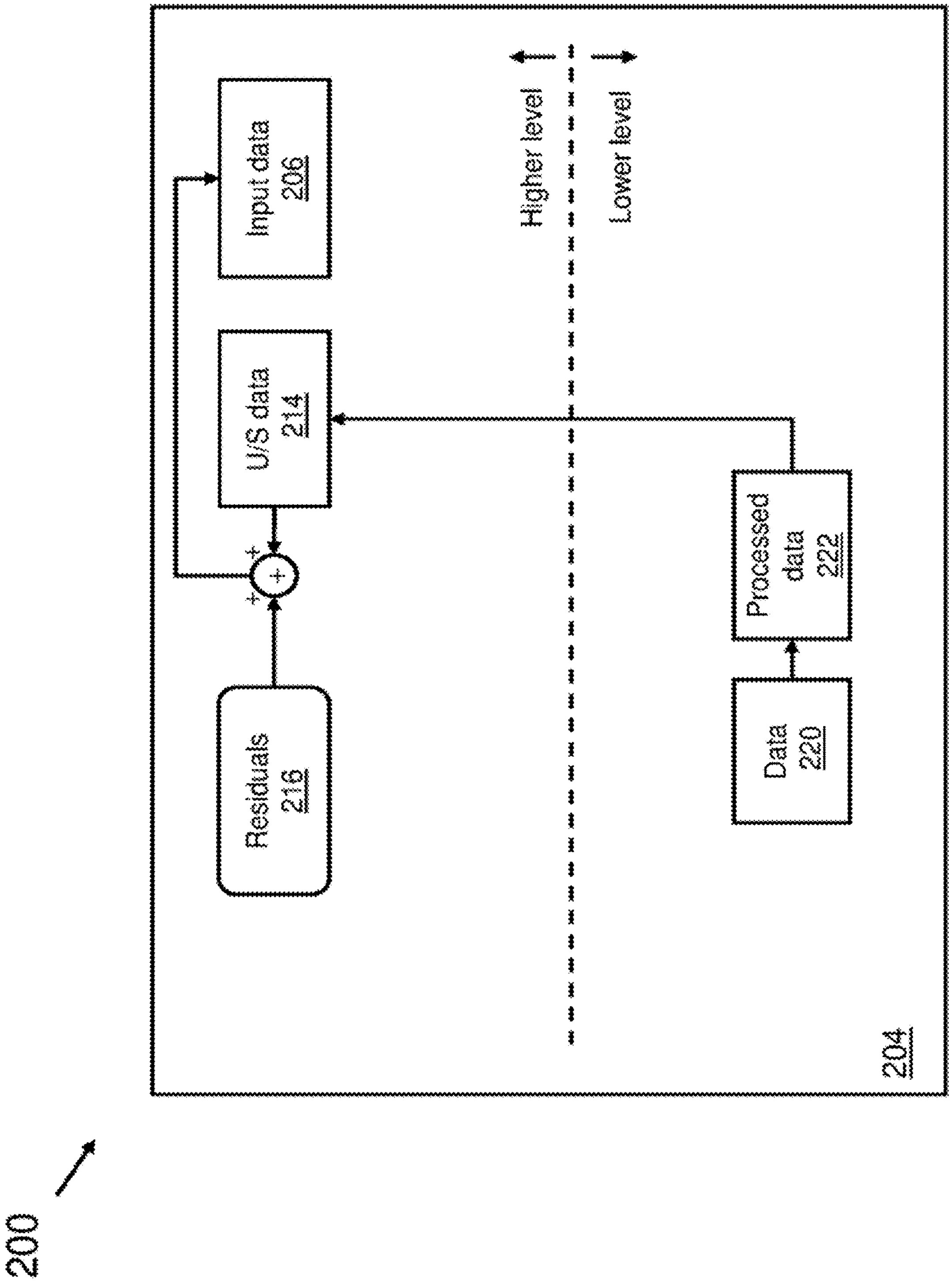

Referring to FIGS. 2A and 2B, there is shown schematically an example of a signal processing system 200. The signal processing system 200 includes a first apparatus 202 comprising an encoder and a second apparatus 204 comprising a decoder. In each of the first apparatus 202 and the second apparatus 204, items are shown on two logical levels. The two levels are separated by a dashed line. Items on the first, highest level relate to data at a relatively high level of quality. Items on the second, lowest level relate to data at a relatively low level of quality. The relatively high and relatively low levels of quality relate to a tiered hierarchy having multiple levels of quality. In some examples, the tiered hierarchy comprises more than two levels of quality. In such examples, the first apparatus 202 and the second apparatus 204 may include more than two different levels. There may be one or more other levels above and/or below those depicted in FIGS. 2A and 2B.

Referring first to FIG. 2A, the first apparatus 202 obtains a first representation of an image at a relatively high level of quality 206. A representation of a given image is a representation of data comprised in the image. The image may be a given frame of a video. The first representation of the image at the relatively high level of quality 206 will be referred to as “input data” hereinafter as, in this example, it is data provided as an input to the encoder in the first apparatus 202. The first apparatus 202 may receive the input data 206. For example, the first apparatus 202 may receive the input data 206 from at least one other apparatus. The first apparatus 202 may be configured to receive successive portions of input data 206, e.g. successive frames of a video, and to perform the operations described herein to each successive frame. For example, a video may comprise frames F1, F2, . . . . FT and the first apparatus 202 may process each of these in turn.

The first apparatus 202 derives data 212 based on the input data 206. In this example, the data 212 based on the input data 206 is a representation 212 of the image at the relatively low level of quality. In this example, the data 212 is derived by performing a downsampling operation on the input data 206 and will therefore be referred to as “downsampled data” hereinafter. In other examples, the data 212 is derived by performing an operation other than a downsampling operation on the input data 206.

In this example, the downsampled data 212 is processed to generate processed data 213 at the relatively low level of quality. In other examples, the downsampled data 212 is not processed at the relatively low level of quality. As such, the first apparatus 202 may generate data at the relatively low level of quality, where the data at the relatively low level of quality comprises the downsampled data 212 or the processed data 213.

In some examples, generating the processed data 213 involves encoding the downsampled data 212. Encoding the downsampled data 212 produces an encoded image at the relatively low level of quality. The first apparatus 202 may output the encoded image, for example for transmission to the second apparatus 204. A series of encoded images, e.g. forming an encoded video, as output for transmission to the second apparatus 204 may be referred to as a "base" stream. Instead of being produced in the first apparatus 202, the encoded image may be produced by an encoding device that is separate from the first apparatus 202. The encoded image may be part of an H.264 encoded video. Generating the processed data 213 may, for example, comprise generating successive frames of video as output by a separate encoding device such as an H.264 video encoder. An intermediate set of data for the generation of the processed data 213 may comprise the output of such an encoder, as opposed to any intermediate data generated by the separate encoding device.

Generating the processed data 213 at the relatively low level of quality may further involve decoding the encoded image at the relatively low level of quality. The decoding operation may be performed to emulate a decoding operation at the second apparatus 204, as will become apparent below. Decoding the encoded image produces a decoded image at the relatively low level of quality. In some examples, the first apparatus 202 decodes the encoded image at the relatively low level of quality to produce the decoded image at the relatively low level of quality. In other examples, the first apparatus 202 receives the decoded image at the relatively low level of quality, for example from an encoding and/or decoding device that is separate from the first apparatus 202. The encoded image may be decoded using an H.264 decoder. The decoding by a separate decoding device may comprise inputting encoded video, such as an encoded data stream configured for transmission to a remote decoding device, into a separate black-box decoder implemented together with the first apparatus 202 to generate successive decoded frames of video. Processed data 213 may thus comprise a frame of video data that is generated via a complex non-linear encoding and decoding process, where the encoding and decoding process may involve modelling spatio-temporal correlations as per a particular encoding standard such as H.264. However, because the output of any encoder is fed into a corresponding decoder, this complexity is effectively hidden from the first apparatus 202.

In an example, generating the processed data 213 at the relatively low level of quality further involves obtaining correction data based on a comparison between the downsampled data 212 and the decoded image obtained by the first apparatus 202, for example based on the difference between the downsampled data 212 and the decoded image. The correction data can be used to correct for errors introduced in encoding and decoding the downsampled data 212. In some examples, the first apparatus 202 outputs the correction data, for example for transmission to the second apparatus 204, as well as the encoded signal. This allows the recipient to correct for the errors introduced in encoding and decoding the downsampled data 212. This correction data may also be referred to as a "first enhancement" stream. As the correction data may be based on the difference between the downsampled data 212 and the decoded image it may be seen as a form of residual data (e.g. that is different from the other set of residual data described later below).

In some examples, generating the processed data 213 at the relatively low level of quality further involves correcting the decoded image using the correction data. For example, the correction data as output for transmission may be placed into a form suitable for combination with the decoded image, and then added to the decoded image. This may be performed on a frame-by-frame basis. In other examples, rather than correcting the decoded image using the correction data, the first apparatus 202 uses the downsampled data 212. For example, in certain cases, just the encoded then decoded data may be used and in other cases, encoding and decoding may be replaced by other processing.

In some examples, generating the processed data 213 involves performing one or more operations other than the encoding, decoding, obtaining and correcting acts described above.

The first apparatus 202 obtains data 214 based on the data at the relatively low level of quality. As indicated above, the data at the relatively low level of quality may comprise the processed data 213, or the downsampled data 212 where the downsampled data 212 is not processed at the lower level. As described above, in certain cases, the processed data 213 may comprise a reconstructed video stream (e.g. from an encoding-decoding operation) that is corrected using correction data. In the example of FIGS. 2A and 2B, the data 214 is a second representation of the image at the relatively high level of quality, the first representation of the image at the relatively high level of quality being the input data 206. The second representation at the relatively high level of quality may be considered to be a preliminary or predicted representation of the image at the relatively high level of quality. In this example, the first apparatus 202 derives the data 214 by performing an upsampling operation on the data at the relatively low level of quality. The data 214 will be referred to hereinafter as "upsampled data". However, in other examples one or more other operations could be used to derive the data 214, for example where data 212 is not derived by downsampling the input data 206. It should be noted that the references to relatively high and relatively low levels of quality may correspond to references to a first and second level of quality, where the second level of quality is higher than the first level of quality. As described herein, in certain cases, the levels of quality may correspond to different spatial resolutions.

The input data 206 and the upsampled data 214 are used to obtain residual data 216. The residual data 216 is associated with the image. The residual data 216 may be in the form of a set of residual elements. A residual element in the set of residual elements 216 may be associated with a respective image element in the input data 206. An example of an image element is a pixel.

In this example, a given residual element is obtained by subtracting a value of an image element in the upsampled data 214 from a value of a corresponding image element in the input data 206. As such, the residual data 216 is useable in combination with the upsampled data 214 to reconstruct the input data 206. The residual data 216 may also be referred to as "reconstruction data" or "enhancement data". In one case, the residual data 216 may form part of a "second enhancement" stream.

The first apparatus 202 obtains configuration data relating to processing of the residual data 216. The configuration data indicates how the residual data 216 has been processed and/or generated by the first apparatus 202 and/or how the residual data 216 is to be processed by the second apparatus 204. The configuration data may comprise a set of configuration parameters. The configuration data may be useable to control how the second apparatus 204 processes data and/or reconstructs the input data 206 using the residual data 216. The configuration data may relate to one or more characteristics of the residual data 216. Different configuration data may result in different processing being performed on and/or using the residual data 216. The configuration data is therefore useable to reconstruct the input data 206 using the residual data 216.

In this example, the first apparatus 202 transmits to the second apparatus 204 data based on the downsampled data 212, data based on the residual data 216, and the configuration data, to enable the second apparatus 204 to reconstruct the input data 206.

Turning now to FIG. 2B, the second apparatus 204 receives data 220 based on (e.g. derived from) the downsampled data 212. The second apparatus 204 also receives data based on the residual data 216. For example, the second apparatus 204 may receive a "base" stream (data 220), a "first enhancement stream" (any correction data) and a "second enhancement stream" (residual data 216). The second apparatus 204 also receives the configuration data relating to processing of the residual data 216. The data 220 based on the downsampled data 212 may be the downsampled data 212 itself, the processed data 213, or data derived from the downsampled data 212 or the processed data 213. The data based on the residual data 216 may be the residual data 216 itself, or data derived from the residual data 216.

In some examples, the received data 220 comprises the processed data 213, which may comprise the encoded image at the relatively low level of quality and/or the correction data. In some examples, for example where the first apparatus 202 has processed the downsampled data 212 to generate the processed data 213, the second apparatus 204 processes the received data 220 to generate processed data 222. Such processing by the second apparatus 204 may comprise decoding an encoded image (e.g. that forms part of a "base" encoded video stream) to produce a decoded image at the relatively low level of quality. In some examples, the processing by the second apparatus 204 comprises correcting the decoded image using obtained correction data. Hence, the processed data 222 may comprise a frame of corrected data at a first or relatively low level of quality. In some examples, the encoded image at the relatively low level of quality is decoded by a decoding device that is separate from the second apparatus 204. The encoded image at the relatively low level of quality may be decoded using an H.264 decoder.

In other examples, the received data 220 comprises the downsampled data 212 and does not comprise the processed data 213. In some such examples, the second apparatus 204 does not process the received data 220 to generate processed data 222.

The second apparatus 204 uses data at the relatively low level of quality to derive the upsampled data 214. As indicated above, the data at the relatively low level of quality may comprise the processed data 222, or the received data 220 where the second apparatus 204 does not process the received data 220 at the relatively low level of quality. The upsampled data 214 is a preliminary representation of the image at the relatively high level of quality. The upsampled data 214 may be derived by performing an upsampling operation on the data at the relatively low level of quality.

The second apparatus 204 obtains the residual data 216. The residual data 216 is useable with the upsampled data 214 to reconstruct the input data 206. The residual data 216 is indicative of a comparison between the input data 206 and the upsampled data 214.

The second apparatus 204 also obtains the configuration data related to processing of the residual data 216. The configuration data is useable by the second apparatus 204 to reconstruct the input data 206. For example, the configuration data may indicate a characteristic or property relating to the residual data 216 that affects how the residual data 216 is to be used and/or processed, or whether the residual data 216 is to be used at all. In some examples, the configuration data comprises the residual data 216.

There are several considerations relating to the use of such configuration data. One such consideration is the amount of information that is generated, stored, transmitted and/or processed. The more information that is used, the greater the amount of resources that may be involved in handling such information. Examples of such resources include transmission resources, storage resources and processing resources. Compared to some known techniques, examples described herein allow a relatively small amount of information to be used. This may reduce the amount of data transmitted via the data communications network 106. The savings may be particularly relevant where the data relates to high quality video data, where the amount of information transmitted in known systems can be especially high.

Another consideration relating to the use of such configuration data is the ability to adapt to different types of decoding device. For example, a given encoder may transmit information to a plurality of decoders each having different characteristics such as processing and/or storage capabilities. It is desirable for the use of configuration data in image reconstruction to be agnostic to the type and/or capability of decoder device that is used to perform the reconstruction. Compared to some known techniques, examples described herein enable different types of decoders having different operating characteristics to process configuration data reliably.

A further consideration relating to the use of such configuration data is the amount and/or the relative complexity of processing involved at the encoder and/or the decoder in order to process the configuration data. Compared to some known techniques, examples described herein reduce an amount and/or a complexity of processing performed by the encoder and/or the decoder in order to obtain and/or process the configuration data. Simplifying the processing performed by the encoder and/or the decoder increases an efficiency of the encoder and/or the decoder.

Other considerations include the ability of the decoder to perform image reconstruction accurately and reliably. Performing image reconstruction accurately and reliably may affect the ultimate visual quality of the displayed image and consequently may affect a viewer's engagement with the image and/or with a video comprising the image. One factor that may influence the accuracy and/or the reliability with which the decoder can perform reconstruction is in providing the decoder with up-to-date and/or accurate information relating to how reconstruction is to be performed. For example, configuration data may change over time and/or change between different images. If the decoder is not informed of such changes promptly, the resulting visual quality of reconstructed images may be affected. Compared to some known techniques, examples described herein allow configuration information to be signaled relatively frequently to the decoder, thereby enabling the decoder to use relatively up-to-date configuration information in image reconstruction.

Error handling is also a consideration. For example, the ability of the decoder to handle potential errors in the processing of configuration data may be a factor in the reliability of the decoder. Compared to some known techniques, examples described herein allow a decoder to handle potential errors as well as the receipt of unexpected or unrecognized data. This may effectively increase the reliability of decoder.

Figure 3:
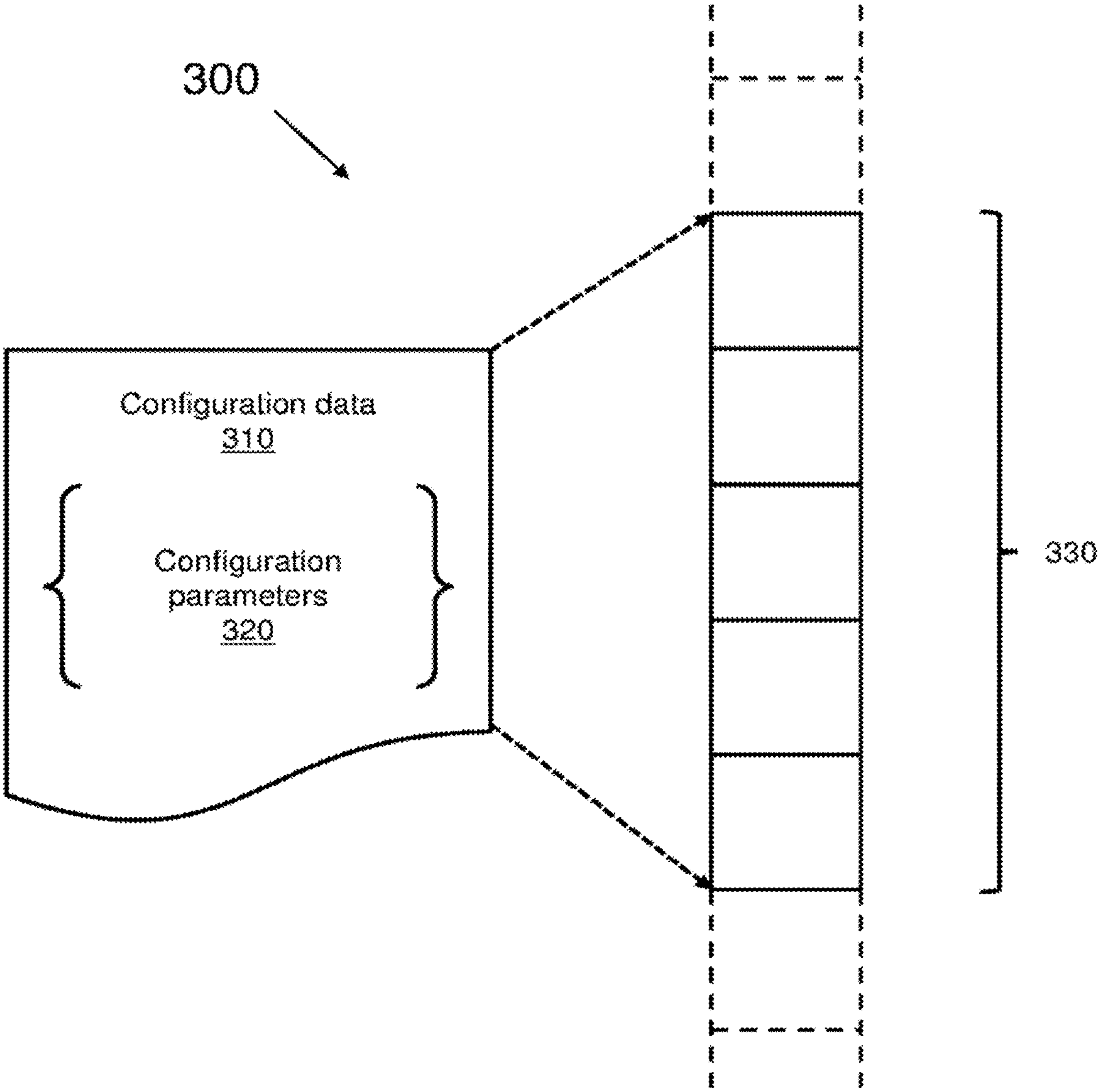
FIG. 3 shows a schematic diagram of an example of a data processing technique in accordance with an embodiment of the present invention.

Referring to FIG. 3, there is shown schematically an example of a data processing technique 300. The data processing technique 300 may be performed by an apparatus comprising an encoder such as the first apparatus 102 described above. The data processing technique 300 involves performing byte-wise processing of configuration data, as described in more detail below.

Configuration data 310 is obtained. The configuration data 310 is related to processing of residual data, for example residual data 216 as described above. It will be understood that configuration data 310 as depicted in FIG. 3 is an illustrative representation of the content of such configuration data. In practical use, configuration data may be read and/or written as a series of 1s and 0 s, for example [01000010].

The configuration data 310 comprises a set of values 320. The set of values 320 corresponds to a set of configuration parameters. The value of a given configuration parameter has a given bit-length. The bit-length is the number of bits that are used to represent the value of the given configuration parameter. The bit-length of a value of a given configuration parameter may be fixed or may be variable. For a variable bit-length, the number of bits that are used to represent the value of the given configuration parameter varies based on the value of the given configuration parameter.

In some examples, the configuration data 310 comprises a reference to a look-up table that stores possible values of a given configuration parameter. For example, the configuration data 310 may comprise a value that is useable to obtain the value of the configuration parameter from the look-up table.

The configuration data 310 is arranged into a sequence of bytes 330. The sequence of bytes 330 comprises an integer number of bytes. In this example, the values of the configuration parameters 320 are arranged into a sequence of bytes comprising 5 bytes, although it will be understood that other numbers of bytes may be used in other examples. In this example, a given byte in the sequence of bytes 330 comprises 8 bits. The sequence of bytes 330 may be part of a larger byte sequence or byte-wise stream. Arranging the configuration data 310 into a sequence of bytes 330 enables byte-wise processing to be performed on the configuration data 310. In byte-wise processing, data is processed on a byte-by-byte basis.

Processing the configuration data 310 in a byte-wise manner may be more efficient than processing the configuration data 310 in a bit-wise manner. Bit-wise processing may involve tracking which bit within a given byte is the next bit to be read or written. When a group of bits that represents a given parameter straddles a byte boundary, additional processing may be performed in order to read the group of bits and obtain the given parameter. Such processing may be reduced in a case where byte-wise processing is performed. In some examples, a number of execution cycles may be reduced when processing data in a byte-wise manner compared to a bit-wise manner.

In some examples, the sequence of bytes 330 is written to memory. Less processing may be involved in storing the configuration data 310 in memory and/or in retrieving the configuration data 310 from memory if the configuration data 310 is handled in a byte-by-byte manner compared to a case in which the configuration data 310 is handled in a bit-by-bit manner. The smallest unit of addressable memory may comprise one byte. As such, information may be stored in memory in a byte-wise manner. Therefore, fewer steps may be involved in storing the configuration data 310 in memory and/or in retrieving the configuration data 310 from memory if the configuration data 310 is packaged into a sequence of bytes. An amount of padding used to package the configuration data 310 into addressable memory units may also be reduced by providing the configuration data 310 to the memory in a byte-wise form.

Furthermore, transmission of the configuration data 310 via a network such as the Internet may be performed more efficiently if the configuration data 310 is arranged into a sequence of bytes. Data may be transmitted over the Internet via the Transmission Control Protocol (TCP). TCP operates in a transport layer of a protocol stack. TCP obtains data from a stream, packages the data into TCP segments and uses an internet module, for example the Internet Protocol (IP), to transmit each TCP segment to a recipient via the Internet. The data stream may be obtained from memory. A TCP segment may comprise an integer number of bytes. As such, less processing may be involved if the TCP obtains the data that is to be packaged into the TCP segments from a byte-wise stream than from a bit-wise stream. An amount of padding used to package the data into TCP segments may also be reduced by providing the data to the TCP in a byte-wise form. In this example, arranging the configuration data 310 into the sequence of bytes 330 is performed at an application layer of a protocol stack. As such, the application layer may process the configuration data 310 in a byte-by-byte manner instead of a bit-by-bit manner.

In some examples, the configuration data 310 comprises values of a plurality of configuration parameters that have different bit-lengths. The configuration data 310 may be packed into the sequence of bytes 330 by arranging the values in a predetermined order. The predetermined order may be a different order than an order in which the values are obtained. As such, the values may be re-arranged.

The values of the configuration parameters 320 may be arranged such that a given byte in the sequence of bytes 330 is filled by the values represented by the different bit-lengths. By filling a given byte in the sequence of bytes 330 with values represented by different bit-lengths arranged in a predetermined order, an amount of padding used in the sequence of bytes 330 may be reduced. As such, data may be packed more efficiently into the sequence of bytes 330 compared to a case in which the values represented by the different bit-lengths are not arranged in the predetermined order. Packing data more efficiently into the sequence of bytes 330 may reduce a number of bytes that are used to store the configuration data 310. An amount of information that is to be transmitted over a network may therefore be reduced.

The sequence of bytes 330 is output for processing by a decoder, such as decoder 110, to enable the decoder to reconstruct the input data 206 using the configuration data 310.

Figure 4:
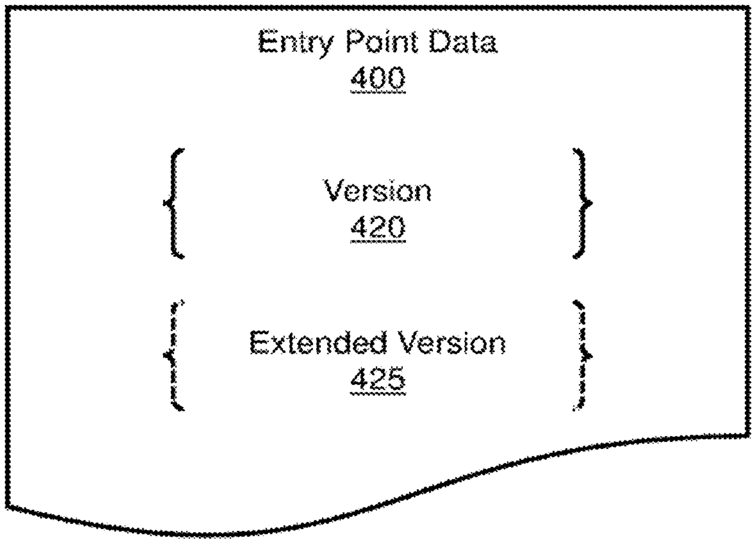
FIG. 4 shows a schematic diagram of an example of entry point data in accordance with an embodiment of the present invention.

Referring to FIG. 4, there is shown schematically an example of entry point data 400. Entry point data 400 may be output by encoder 108 and received by decoder 110. Entry point data 400 is a type of configuration data. In some examples, entry point data 400 forms part of configuration data 310. Entry point data 400 may be read by the decoder 110 before other configuration data is read. As such, entry point data 400 may be the first configuration data that is processed by the decoder 110 for a given received video stream.

Entry point data 400 comprises a version parameter 420. The version parameter 420 may indicate a version number. The version may be a version of a syntax according to which configuration data is arranged. The syntax may be considered a framework that defines how configuration data is to be processed and/or defines the configuration parameters that are to be included in the configuration data. The encoder 108 and/or the decoder 110 may be configured to operate in accordance with the version of the syntax indicated by the version parameter 420.

The value of the version parameter 420 has a fixed bit-length. In some examples, the value of the version parameter 420 has a bit-length of 8 bits. As such, the value of the version parameter 420 may be stored in a fixed-length element in the sequence of bytes 330. A fixed-length element comprises a predetermined integer number of bytes.

In this example, entry point data 400 comprises an extended version parameter 425. The value of the extended version parameter 425 has a variable bit-length. The value of the extended version parameter 425 may be stored in a variable-length element in the sequence of bytes 330.

A variable-length element comprises an integer number of bytes in the sequence of bytes 330. The variable-length element may be referred to as a "multi-byte" element, although in some examples the variable-length element comprises a single byte. The one or more bytes of the variable-length element may be contiguous in the sequence of bytes 330. In some examples, the one or more bytes of the variable-length element are non-contiguous in the sequence of bytes 330.

At least one given byte of the variable-length element has one or more predetermined bits arranged to indicate whether or not the variable-length element comprises one or more additional bytes to the at least one given byte. In some examples, the one or more predetermined bits comprises a single predetermined bit. In other examples, the one or more predetermined bits comprises more than one predetermined bit. In some examples, each byte of the variable-length element comprises the one or more predetermined bits. In other examples, at least one byte of the variable-length element does not comprise the one or more predetermined bits.

In a case where the one or more predetermined bits comprises a single predetermined bit, the single predetermined bit may be considered a flag that indicates whether or not the one or more additional bytes are present in the variable-length element. For example, if the variable-length element contains an additional byte to the at least one given byte, the value of the predetermined bit may be set to 1. If, on the other hand, the variable-length element does not contain an additional byte to the at least one given byte, the value of the predetermined bit may be set to 0. In other words, the predetermined bit indicates whether the variable-length element extends beyond the at least one given byte.

The one or more predetermined bits may be arranged at an end of the at least one given byte. For example, the one or more predetermined bits may comprise one or more last bits of the at least one given byte. In some examples, the one or more predetermined bits comprises one or more first bits of the at least one given byte. In some examples, each of the at least one given byte comprises seven bits arranged to store the value of the extended version parameter 425 and one bit arranged to indicate whether or not the variable-length element comprises one or more additional bytes to the at least one given byte.

As such, the value of the extended version parameter 425 may be represented using the variable-length element regardless of the bit-length of the value of the extended version parameter 425. The variable-length element comprises the minimum number of bytes that are useable to store the value of the extended version parameter 425. The use of the variable-length element may therefore reduce an amount of information that is stored, processed and/or transmitted compared to a case in which a fixed-length element is used that has a size that corresponds to a maximum conceivable bit-length of the value of the extended version parameter 425. The variable-length element enables the number of possible values that can be used to represent the extended version parameter 425 to be increased as necessary and in a flexible manner. As such, the variable-length element may be used to provide for future developments and/or modifications to the configuration data 310, for example by allowing for an increase in the bit-length of the value of the extended version parameter 425, without the need for relatively complex modifications to the structure of the configuration data 310.

In this example, the extended version parameter 425 is used selectively. This is depicted using dashed lines in FIG. 4. The extended version parameter 425 is used if it is determined that the fixed-length version parameter 420 is insufficient to store the value of the version number. In some examples, the value of the version number is stored in the extended version parameter 425 in response to determining that the value of the version number has a predetermined relationship with a predetermined threshold value. In some examples, the predetermined relationship comprises the value of the version number being greater than or equal to the predetermined threshold value. In some examples, if it is determined that the value of the version number does not have the predetermined relationship with the predetermined threshold value, the value of the version number is stored in the version parameter 420 instead of in the variable-length extended version parameter 425. Using a variable-length element selectively reduces an amount of information that is used, stored and/or transmitted compared to a case in which the variable-length element is used regardless of the value of the version number.

In some examples, the predetermined threshold value is related to the bit-length of the fixed-length element, namely the bit-length of the version parameter 420. For example, if the fixed-length element comprises eight bits, values between 0 and 255 may be represented by the fixed-length element. The predetermined threshold value in such a case may be 255, for example. As such, if the value of the version number is greater than 255, the variable-length extended version parameter 425 may be used instead of or in addition to the fixed-length version parameter 420 to store the value of the version number.

In some examples, data is stored in the version parameter 420 to indicate that the version number is stored in the extended version parameter 425. In some examples, the data comprises at least one predetermined bit in the version parameter 420. The data stored in the version parameter 420 enables the decoder 110 to determine that the value of the version number is stored in the extended version parameter 425.

The above-described use of variable-length elements and/or selective inclusion of such variable-length elements may also apply to other configuration parameters of configuration data output by the encoder 108.

Additionally, or alternatively to selectively including configuration parameters corresponding to variable-length elements, the encoder 108 may selectively include configuration parameters corresponding to fixed-length elements. In some examples, the configuration data generated by the encoder 108 comprises a parameter presence indicator. The parameter presence indicator specifies whether or not a given set of configuration parameters are comprised in a given part of the configuration data. The given set of configuration parameters has a predetermined format. In the example relating to the version number described above, the parameter presence indicator comprises the predetermined bit in the version parameter 420 that indicates that the extended version parameter 425 is being included. Parameter presence indicators correspond to nested logical statements such as IF statements. That is, if a parameter presence indicator has or is given a particular value, the given set of configuration parameters are included in the configuration data. Including the given set of configuration parameters selectively reduces an amount of information that is used, stored and/or transmitted compared to a case in which the given set of configuration parameters are not selectively included.

Figure 5:
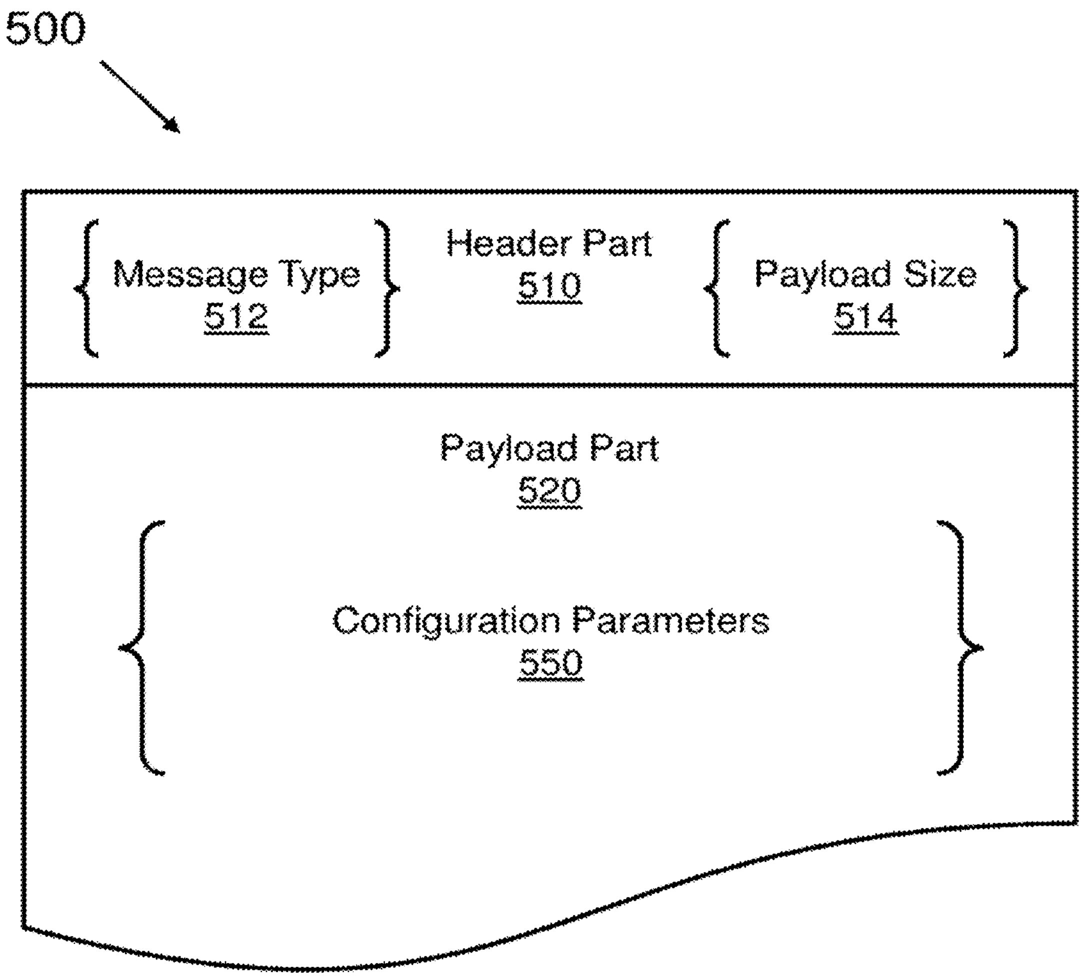
FIG. 5 shows a schematic diagram of an example of a configuration message in accordance with an embodiment of the present invention.

Referring to FIG. 5, there is shown schematically an example of a configuration message 500. The configuration message 500 may form part of configuration data 310. The configuration message 500 may be generated by encoder 108. The configuration message 500 may be received and/or read by decoder 110 after entry point data 400 has been received and/or read.

The configuration message 500 comprises a header part 510 and a payload part 520. The payload part 520 comprises a set of configuration parameters 550. The set of configuration parameters 550 are related to processing of residual data, for example residual data 216 as described above. In some examples, the configuration message 500 is an integer number of bytes long.

The header part 510 comprises a message type parameter 512. The message type parameter 512 specifies a message type of the configuration message 500. The message type specified by the message type parameter 500 may indicate how the configuration message 500 is to be processed. Example types of configuration message are described below.

The message type parameter 512 is indicative of the payload part 520 having a given payload format. The payload format of the payload part 520 may be determined based on the message type of the configuration message 500. The payload format may define a set of configuration parameters that are comprised in the payload part 520. In some examples, the payload format of the payload part 520 defines a particular processing logic that specifics how the content of the payload part 520 is to be processed. The payload part 520 has a format size. The format size of the payload part 520 corresponds to the payload format of the payload part 520. The format size of a payload part having a given payload format is predetermined or can be determined from the content of the payload part. For example, the format size may be determined based on the combined size of the individual configuration parameters that are defined by the payload format. The format size may be considered to be a possible size or a suggested size of the payload part 520.

The header part 510 also comprises a payload size parameter 514. The payload size parameter 514 specifies the actual size of the payload part 520. The actual size of the payload part 520 may be an integer number of bytes.

In some examples, the value of the payload size parameter 514 is stored in a fixed-length element. The fixed-length element storing the value of the payload size parameter 514 may comprise a predetermined number of bits in a given byte of the header part 510. For example, the value of the payload size parameter 514 may be stored in a fixed-length element comprising three bits in a one-byte header part.

In some examples, the payload size parameter 514 comprises a reference to a payload size look-up table that stores possible values of the actual size of the payload part 520. For example, the payload size parameter 514 may comprise a value that is useable to obtain the actual size of the payload part 520 from the payload size look-up table.

In some examples, the value of the payload size parameter 514 is stored in a variable-length element. This may be the case, for example, when the actual size of the payload part 520 is not one of the values specified in the payload size look-up table. The actual size of the payload part 520 specified by the payload size parameter 514 may have a variable bit-length. As such, the payload size parameter 514 may be represented using the variable-length element regardless of the bit-length of the payload size parameter 514. The variable-length element comprises the minimum number of bytes that are useable to store the value of the payload size parameter 514.

In some examples, data is stored in a fixed-length element that indicates that the value of the payload size parameter 514 is stored in a variable-length element. For example, if it is determined that the value of the payload size parameter 514 is one of a predetermined set of values, the value may be stored in the fixed-length element and/or the fixed-length element may include a reference to the payload size look-up table. If, on the other hand, it is determined that the value of the payload size parameter 514 is not one of the predetermined set of values, a variable-length element may be used to store the value, and the fixed-length element may be arranged to indicate, for example via a flag comprised in the fixed-length element, that the variable-length element is being used to store the value.

In this example, the header part 510 contains only the message type parameter 512 and the payload size parameter 514. In other examples, the header part 510 comprises one or more further parameters. In some examples, the header part 510 is one byte long. For example, the message type parameter 512 may be represented by five bits and the payload size parameter 514 may be represented by the remaining three bits of the one-byte header part 510. In other examples, for example where a variable-length element is used to represent the actual size of the payload part 520, the header part 510 comprises more than one byte.

The actual size of the payload part 520 may be the same as or different from the format size of the payload part 520. Regardless of whether or not the actual size and the format size are the same, the payload size parameter 514 specifying the actual size is included in the header part 510 of the configuration message 500.

Including a payload size parameter 514 that specifies the actual size of the payload part 520 when a possible size of the payload part 520, namely the format size, can be inferred from the message type parameter 512 may appear to be inefficient and/or a duplication of information, particularly when the format size and the actual size are the same. Including a payload size parameter 514 in the configuration message 500 involves a greater amount of data being used for the configuration message 500 compared to a case in which no such parameter is included. However, including the payload size parameter 514 in the configuration message 500 facilitates more efficient and reliable processing of the decoder 110 and/or improved error handling compared to a case in which no such parameter is used, as will be described in more detail below.

Figure 6:
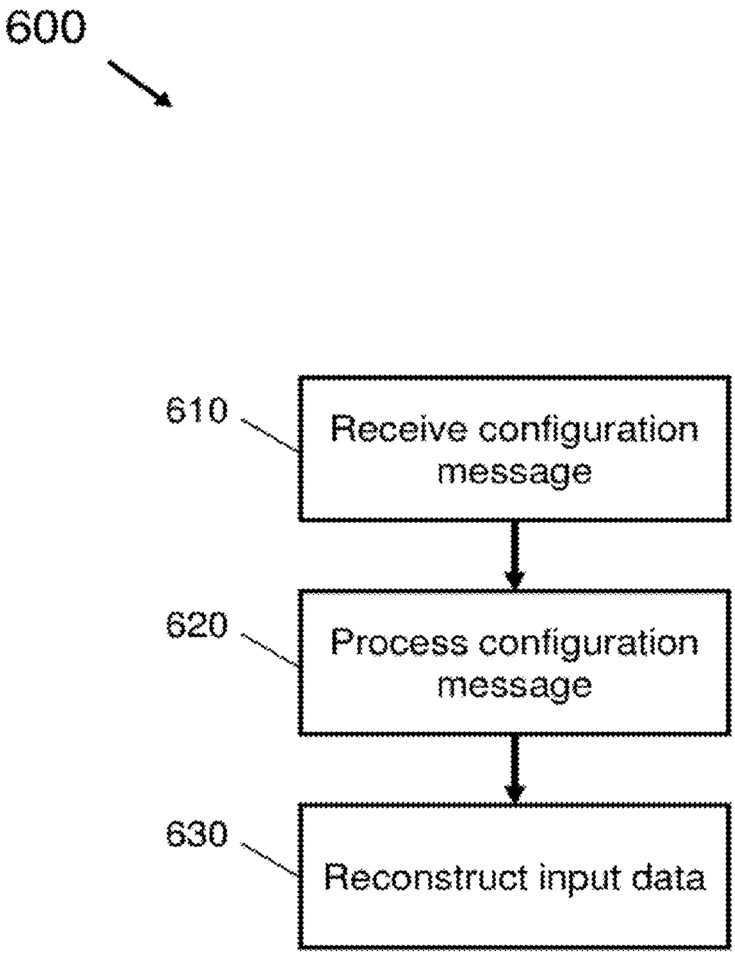
FIG. 6 is a flow diagram depicting an example of a method in accordance with an embodiment of the present invention.

Referring to FIG. 6, there is shown an example of a method 600 of processing configuration data. The method 600 may be performed by an apparatus comprising a decoder such as the second apparatus 104 described above.

In some examples, residual data is received. In this example, the received residual data is residual data 216 described above. The residual data 216 may be received from an encoder such as encoder 108.

At item 610, a configuration message is received. In this example, the received configuration message is configuration message 500 described above. The configuration message 500 may be received from encoder 108.

At item 620, the received configuration message 500 is processed using the message type parameter 512 and the payload size parameter 514. The configuration message 500 is processed to obtain the set of configuration parameters 550 stored in the payload part 520 of the configuration message 500.

In some examples, processing the configuration message 500 comprises parsing the header part 510 of the configuration message 500 to obtain the message type parameter 512 and the payload size parameter 512. Based on the payload size parameter 514, the actual size of the payload part 520 is determined. Based on the message type parameter 512, the message type of the configuration message 500 is determined. The configuration message 500 is processed in accordance with the determined message type and the determined actual size of the payload part 520.

Processing the configuration message 500 comprises parsing the payload part 520 to obtain the configuration data 550. In some examples, processing the configuration message 500 comprises tracking the number of bytes of the configuration message 500 that have been read as the payload part 520 is parsed. The decoder 110 may detect the occurrence of an under-read if there is a determined discrepancy between the number of bytes read when parsing the payload part 520 and the actual size of the payload part 520 as specified by the payload size parameter 514. An under-read may be a potential source of errors when processing configuration messages.

In some examples, the payload size parameter 514 is used to determine the start of a following configuration message. The following configuration message may be a next successive configuration message relative to configuration message 500 in a sequence of configuration messages received by the decoder 110. The sequence of configuration messages may form part of configuration data. Configuration message 500 and the following configuration message may correspond to the same image or to different images. For example, configuration message 500 may correspond to a first image in an image sequence and the following configuration message may correspond to a second, different image in the image sequence.

In some examples, processing the configuration message 500 comprises discarding at least part of the content of the payload part 520. The at least part of the content of the payload part 520 may be discarded using the payload size parameter 514. For example, the decoder 110 may skip to the next configuration message, the start of the next configuration message having been determined using the payload size parameter 514, without processing at least part of the content of the payload part 520.

Using the payload size parameter 514 therefore enables the decoder 110 to handle possible under-reads in an efficient manner. Using the payload size parameter 514 to locate the start of the following message also enables the decoder 110 to maintain a correct alignment or synchronisation with a bytestream comprising multiple configuration messages. For example, even if the content and/or format of a given configuration message is unrecognized, unexpected and/or has been updated without the knowledge of the decoder 110, the decoder 110 is still able to locate the start of the following configuration message and thus remain synchronised with the bytestream. Furthermore, if a bytestream becomes malformed, the decoder 110 is able to detect when an over-read is about to occur and respond accordingly. For example, the decoder 110 may abort processing of the current configuration message and reset the bytestream to the determined location of the start of the next configuration message. Processing the configuration message 500 using the payload size parameter 514 therefore improves the reliability and/or adaptability of the decoder 110 compared to a case in which such a parameter is not used, in that the decoder 110 is able to handle configuration messages that have been modified and/or that are unrecognized and/or unexpected. The decoder 110 is also able to handle potential under-reads and over-reads without falling out of synch with the bytestream, thereby improving the ability of the decoder 110 to handle potential errors.

In some examples, processing the configuration message 500 comprises parsing first content of the payload part 520. The first content corresponds to the format size of the payload part 520. The first content may comprise the set of configuration parameters 550. The first content may comprise first configuration data. Processing the configuration message 500 may further comprise discarding the remaining content of the payload part 520 using the payload size parameter 514. The remaining content of the payload part 520 comprises content of the payload part 520 that is not comprised in the first content. The remaining content comprises further configuration data. The presence of the remaining content may be determined by detecting a discrepancy between the format size and the actual size of the payload part 520. In other words, if it is determined that the actual size is greater than the format size, it is determined that additional content, beyond the content that is expected based on the format size, is present in the payload part 520.

At item 630, input data 206 is reconstructed using the obtained set of configuration parameters 550. The input data 206 may be reconstructed by using the residual data 216 in accordance with the obtained set of configuration parameters 550.

In some examples, the payload part 520 of configuration message 500 comprises a first and a second payload portion. The payload size parameter 514 may be indicative of a total size of the first and the second payload portions. The first and the second payload portion may comprise first and second configuration data, respectively. In some examples, the second configuration data comprises supplementary configuration data. The supplementary configuration data is arranged to supplement the first configuration data. The second payload portion may be arranged subsequently with respect to the first payload portion. As such, the first payload portion may be received, processed and/or parsed by the decoder 110 before the second payload portion is received, processed and/or parsed.

In some examples, the header part 510 does not specify the size of the first payload portion and/or the size of the second payload portion. In some examples, the size of the first payload portion may be determined based on the format size indicated by the message type parameter 512. As such, the format size indicated by the message type parameter 512 may reflect the content of the first payload portion but not the content of the second payload portion.

The first configuration data relates to a first set of one or more decoders. The first set of one or more decoders has a first operating characteristic. An example of an operating characteristic is a processing capability. The second configuration data relates to a second set of one or more decoders. The second set of one or more decoders has a second operating characteristic. The decoder 110 to which the configuration message 500 is transmitted may be comprised in the first set or the second set. The encoder 108 that generates the configuration message 500 may be unaware which set of decoders the decoder 110 is comprised in. The encoder 108 may transmit the configuration message 500 to multiple decoders across both sets of decoders.

In some examples, the first operating characteristic corresponds to a first version according to which the first set of one or more decoders is configured to operate, and the second operating characteristic corresponds to a second, different version according to which the second set of one or more decoders is configured to operate. The second version may be a later version relative to the first version. The first and second versions may be different versions of the syntax framework that defines how configuration messages are to be processed and/or that defines the content of such configuration messages. Therefore, when the syntax is updated from the first version to the second version, the second configuration data is added to a configuration message that contains the first configuration data from the first version. The second configuration data may, for example, be appended to the first configuration data.

Adding the second configuration data to a configuration message of an existing message type instead of generating a new message type to accommodate the second configuration data reduces an amount of data that is stored, transmitted and/or processed compared to a case in which new message types are generated. By modifying the configuration of existing message types instead of defining new message types, the total number of configuration messages used to convey all relevant configuration data may be reduced. Each configuration message has a corresponding header which may be at least one byte long. Therefore, by reducing the overall number of configuration messages, the amount of data that is stored, transmitted and/or processed may be reduced.

In some examples, the decoder 110 is not able to process both the first and the second payload portion. For example, the encoder 108 may have undergone an update according to which the second configuration data is included in the configuration message 500, but the decoder 110 may not have undergone such an update. In other words, the encoder 108 and the decoder 110 may operate according to different versions of the syntax. In such examples, there may be a discrepancy in the format size of the payload part 520 as interpreted by the encoder 108 and as interpreted by the decoder 110. For example, the format size according to the encoder 108, being aware of the additional content of the payload part 520 and the updated payload format following the version update, is different from the format size according to the decoder 110, since the decoder 110 is unaware of the additional content and the updated payload format and is operating according to the previous version. For the encoder 108, the format size is equal to the actual size of the updated payload part 520, but for the decoder 110 it is not. The format size alone may therefore be an unreliable indicator of the actual size of the payload part 520. Including the payload size parameter 514 that specifies the actual size of the payload part 520 therefore facilitates more reliable processing of the decoder 110.

In some examples, for example if the decoder 110 is in the first set of decoders, the first payload portion is parsed by the decoder 110 and the second payload portion is not parsed by the decoder 110. Parsing the first payload portion but not the second payload portion enables the decoder 110 to obtain the first configuration data but not the second configuration data. In some examples, for example if the decoder 110 is in the second set of decoders, the second payload portion is parsed by the decoder 110 and the first payload portion is not parsed by the decoder 110. Parsing the second payload portion but not the first payload portion 522 enables the decoder 110 to obtain the second configuration data but not the first configuration data. In some examples, for example if the decoder 110 is in the second set of decoders, both the first and the second payload portion are parsed to obtain both the first and the second configuration data.

As described above, the payload size parameter 514 may be used to determine the start of a following configuration message. In some examples, for example if the decoder 110 is in the first set of decoders, the content of the second payload portion is discarded. The content of the second payload portion may be discarded by using the total size of the payload part 520 specified in the payload size parameter 514. Using the payload size parameter 514 to locate the start of the following message enables the decoder 110 to remain synchronised with the bytestream regardless of whether the decoder 110 is in the first set of decoders or the second set of decoders.

In a case where the decoder 110 obtains both the first and the second configuration data, the first representation 206 of the image is reconstructed using both the first and the second configuration data. In a case where the decoder 110 processes only one of the first and the second payload portions, the first representation 206 of the image may be reconstructed using the obtained one of the first and the second configuration data. As such, the use of the configuration message 500 to reconstruct the first representation 206 may be agnostic to the type of decoder and/or to the version number according to which the decoder 110 is configured to operate.

Figure 7:
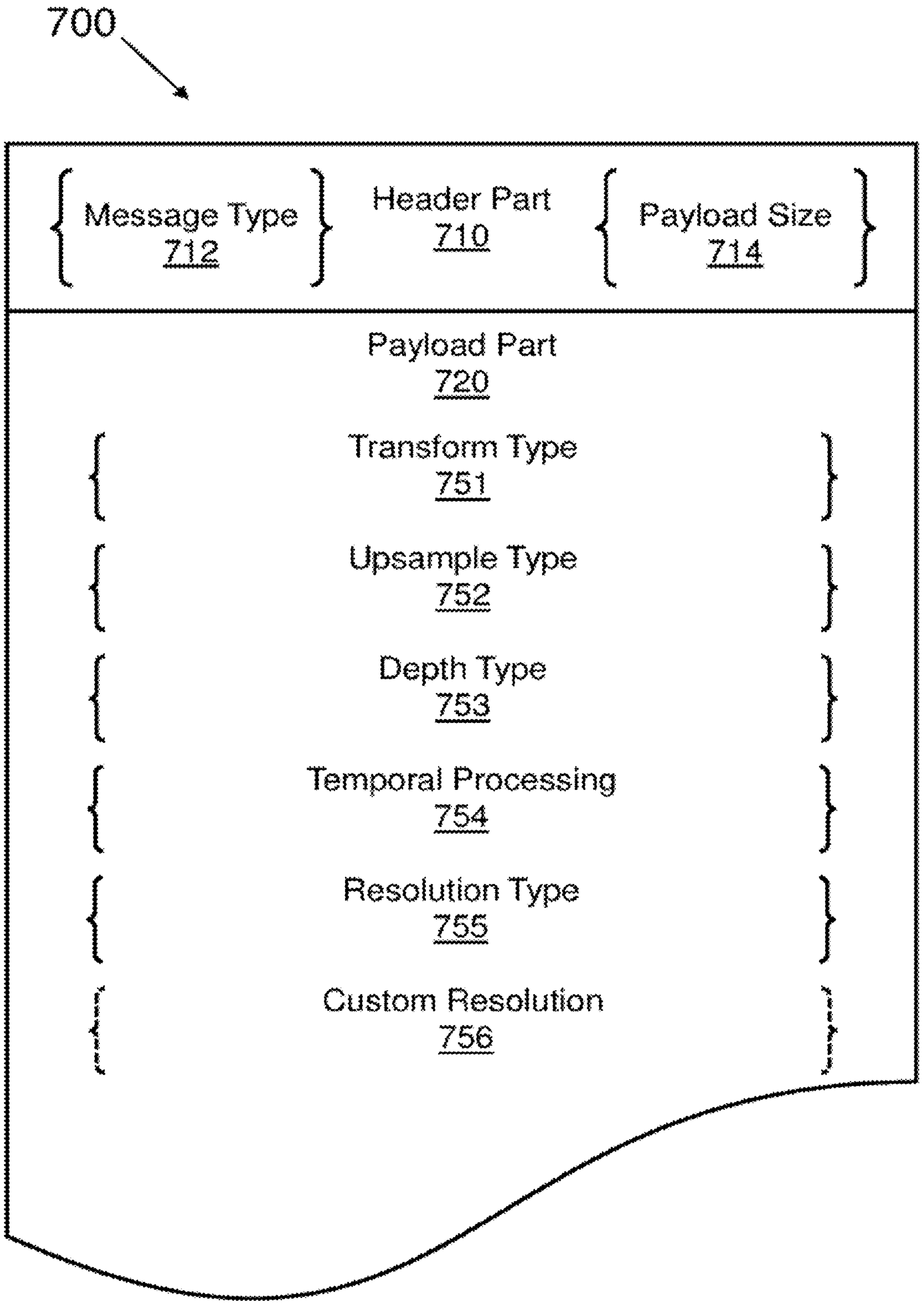
FIG. 7 shows a schematic diagram of another example of a configuration message in accordance with an embodiment of the present invention.

Referring to FIG. 7, there is shown a schematic diagram of an example of a configuration message 700. The configuration message 700 may form part of configuration data 310. The configuration message 700 may be generated by encoder 108. Some items depicted in FIG. 7 are similar to items shown in FIG. 5. Corresponding reference signs, incremented by 200, have therefore been used for similar items.

Configuration message 700 is a more specific example of configuration message 500. Configuration message 700 comprises a header part 710 and a payload part 720. The header part 710 comprises a message type parameter 712 and a payload size parameter 714. The payload part 720 comprises a set of configuration parameters. The set of configuration parameters are related to processing of residual data 216. In some examples, the configuration message 700 is an integer number of bytes long.

The message type of the configuration message 700 is an image set configuration message. An image set configuration message corresponds to multiple images in a set of images. In some examples, the set of images comprises 75 images. The set of images may be part of a video signal. For example, the set of images may comprise consecutive frames of a video. The video may be a streamed video. An example of a video is a broadcast video. For example, the video may be broadcast via the data communications network 106. In some examples, the set of images is encoded as a group of pictures (GOP). A GOP is an encoding of a sequence of images each of which may be decoded using information contained entirely within the GOP. A video may comprise multiple such GOPs.

In some examples, an image set configuration message corresponds to every image in a set of images. The payload part 720 comprises a set of image set configuration parameters. The set of image set configuration parameters has a predetermined format.

In this example, the set of image set configuration parameters comprises a transform type parameter 751. The transform type parameter 751 relates to a transformation operation performed on the residual data 216. The transformation operation may be a directional decomposition operation. One example of a directional decomposition operation is a Hadamard transform. The transformation operation may exploit spatial and/or directional correlation between residual elements in the residual data 216. Performing the transformation operation on the residual data 216 results in transformed residual data. The transformed residual data may be smaller than the residual data 216. The transformed residual data may have a lower encoding entropy than the residual data 216. As such, it may be more efficient for the encoder 108 to transmit the transformed residual data than the residual data 216. The decoder 110, receiving the transformed residual data, may then perform an inverse transformation operation on the transformed residual data to obtain the residual data 216. The encoder 108 thus signals to the decoder 110 which transformation operation has been applied to the residual data 216 via the transform type parameter 751. In some examples, the transform type parameter 751 specifies a transformation operation from a plurality of possible transformation operations that may be applied to the residual data 216. In some examples, the value of the transform type parameter 751 has a fixed bit-length. For example, the value of the transform type parameter 751 may have a bit-length of two bits.

In this example, the set of image set configuration parameters comprises an upsample type parameter 752. The upsample type parameter 752 relates to an upsampling operation. The upsampling operation is performed, for each image in the set of images, on a representation of the image at the relatively low level of quality. The upsampling operation is performed on the representation at the relatively low level of quality to derive the upsampled data 214. The encoder 108 performs such an upsampling operation in order to derive the residual data 216. The decoder 110 may perform a corresponding upsampling operation in order to reconstruct the input data 206, namely by combining the upsampled data 214 with the residual data 216. The encoder 108 thus signals to the decoder 110 which upsampling operation is to be used via the upsample type parameter 752. In some examples, the upsample type parameter 752 specifies an interpolation operation from a plurality of possible interpolation operations. Examples of possible interpolation operations include nearest neighbour interpolation, bilinear interpolation, bicubic interpolation and Lanczos interpolation. In some examples, the upsample type parameter specifies whether upsampling is performed in one dimension or two dimensions. In other words, the upsample type parameter 752 may specify whether one or both of horizontal and vertical upsampling is performed on the representation at the relatively low level of quality. In some examples, the configuration parameter relating to the upsampling operation may specify whether horizontal or both of horizontal and vertical upsampling is performed on the representation at the relatively low level of quality. In some examples, the value of the upsample type parameter 752 has a fixed bit-length. In one example, the value of the upsample type parameter 752 has a bit-length of three bits. In another example, the value of the upsample type parameter 752 has a bit-length of four bits.

In this example, the set of image set configuration parameters comprises a depth type parameter 753. The depth type parameter 753 relates to a bit depth. The bit depth is associated with the residual data 216 for a given image in the set of images. The bit depth may also be referred to as a colour depth. In some examples, bit depth indicates the number of bits used to indicate the colour of a given pixel in a given image. As such, the bit depth may be indicative of how finely colour can be represented in the given image. In some examples, the bit depth indicates the number of bits used for each colour component of a given pixel in a given image. In some examples, a given residual element in the residual data 216 for a given image comprises a plurality of colour components (e.g. for YUV or RGB data). The bit depth may indicate the number of bits used for each colour component of the given residual element. Different colour components may have different bit lengths. In some examples, the value of the depth type parameter 753 has a fixed bit-length. In one example, the value of the depth type parameter 753 has a bit-length of two bits. In another example, the value of the depth type parameter 753 has a bit-length of four bits.

In this example, the set of image set configuration parameters comprises a temporal processing parameter 754. The temporal processing parameter 754 specifies an extent of temporal processing associated with reconstructing, for a given image in the set of images, the input data 206. Performing temporal processing comprises using data based on multiple images in the set of images. In some examples, each of the images in the set of images corresponds to a different time sample of a video. For example, temporal processing may adjust data for a given frame of video, such as data derived from residual data for the frame, using data for a different frame of video, such as data derived from residual data for the different frame. The data based on multiple images may be indicative of an extent of temporal correlation between residual data for the given image and residual data for one or more further images in the set of images. The one or more further images may correspond to one or more earlier time samples in the video relative to a time sample corresponding to the given image. For example, data at least derived from residual data that is associated with a previous frame of video may be used to reconstruct a current frame of video via modification of data at least derived from residual data that is associated with the current frame.

In some examples, the data based on multiple images comprises temporal correlation data. Temporal correlation data may comprise data that is based on a difference between residual data for the given image and corresponding residual data for the one or more further images. This may be a difference based on data for a current frame and data for a previous frame. For image sequences that exhibit a relatively high degree of temporal correlation, it may be more efficient to use and/or output the temporal correlation data than the residual data for the given image.

In some examples, the value of the temporal processing parameter 754 is based on an optimization metric. An optimization operation may be performed in order to determine whether the residual data or the temporal correlation data is more efficient to use and/or output for the given image. Based on the optimization metric, the value of the temporal processing parameter 754 may instruct the decoder 110 to reconstruct a given frame of video based on one of the residual data and the temporal correlation data. This may reflect a processing that has been performed at a corresponding encoder. The optimization operation may comprise a rate-distortion analysis, as described in more detail below.

The value of the temporal processing parameter 754 may have a bit-length of one bit. For example, this may indicate whether temporal processing is to be performed or not (a binary determination), e.g. in relation to a given frame of video. As such, the temporal processing parameter 754 may be stored in a predetermined bit in a given byte of configuration data.

In this example, the set of image set configuration parameters comprises a resolution type parameter 755 specifying a resolution of the input data 206 for a given image in the set of images. In some examples, the value of the resolution type parameter 755 has a fixed bit-length. In one example, the value of the resolution type parameter 755 has a bit-length of seven bits.

In some examples, the set of image set configuration parameters comprises a custom resolution parameter 756. The custom resolution parameter relates to a resolution of the input data 206. The custom resolution parameter 756 may be included in the image set configuration message 700 selectively. This is depicted using dashed lines in FIG. 7. For example, the custom resolution parameter 756 may be included if it is determined that the resolution of the input data 206 is not one of a predetermined set of values that may be specified by the resolution type parameter 755. Data may be stored in the resolution type parameter 755 to indicate that the custom resolution parameter 756 is included in the image set configuration message 700. Such data may comprise a predetermined bit in the resolution type parameter 755. The predetermined bit therefore comprises a parameter presence indicator that indicates the presence of the custom resolution parameter 756 in the image set configuration message 700.

The set of image set configuration parameters may comprise more, fewer or different parameters than those described above with reference to FIG. 7.

The image set configuration message 700 corresponds to multiple images in the set of images. In this example, the image set configuration message 700 corresponds to all of the images in the set of images. As such, a single set of image set configuration parameters is applicable to every image in the set of images. Image set configuration data may also be referred to as "global configuration data".

The image set configuration message 700 is output to the decoder 110 to enable the decoder 110 to reconstruct, for each image in the set of images, the input data 206 using the upsampled data 214 and the residual data 216.

The number of times the image set configuration message 700 is output for the set of images is less than the number of images in the set of images. Outputting the image set configuration message 700 for a number of images that is less than the number of images in the set of images reduces the amount of information that is transmitted over a given period of time. In this example, the number of times the image set configuration message 700 is output for the set of images is one. The image set configuration message 700 may be output for the first image only in the set of images. The first image in the set of images may be the first image in the set of images that is output, received, processed and/or displayed. Outputting the image set configuration message 700 for the first image in the set of images may enable the recipient to receive the image set configuration data as early as possible, and/or may enable the recipient to apply the image set configuration data to as many images in the set of images as possible. In some examples, the image set configuration message 700 is output with or alongside the first image in the set of images. In some examples, the image set configuration message 700 is output for an image other than the first image in the set of images. In some examples, the number of times the image set configuration message 700 is output for the set of images is greater than one but less than the number of images in the set of images. In one example, the image set configuration message 700 is output once for a set of images comprising 75 images.

In some examples, the number of times the image set configuration message 700 is output for the set of images is based on an optimization metric. An example of an optimization metric is a rate-distortion metric. Rate-distortion optimization optimizes the amount of data that is transmitted against an amount of loss of visual quality. The more infrequently the image set configuration message 700 is output, the less data is transmitted. However, outputting the image set configuration message 700 too infrequently may result in an undesirable loss of quality due to the decoder 110 not being provided with up-to-date configuration data. Therefore, the number of times the image set configuration message 700 is output is optimized so as to reduce the amount of data sent whilst reducing any loss in visual quality.

In some examples, a ratio of the number of times the image set configuration message 700 is output for the set of images to the number of images in the set of images is less than a predetermined threshold value. The predetermined threshold value may be based on an optimization metric such as the rate-distortion metric described above.

Figure 8:
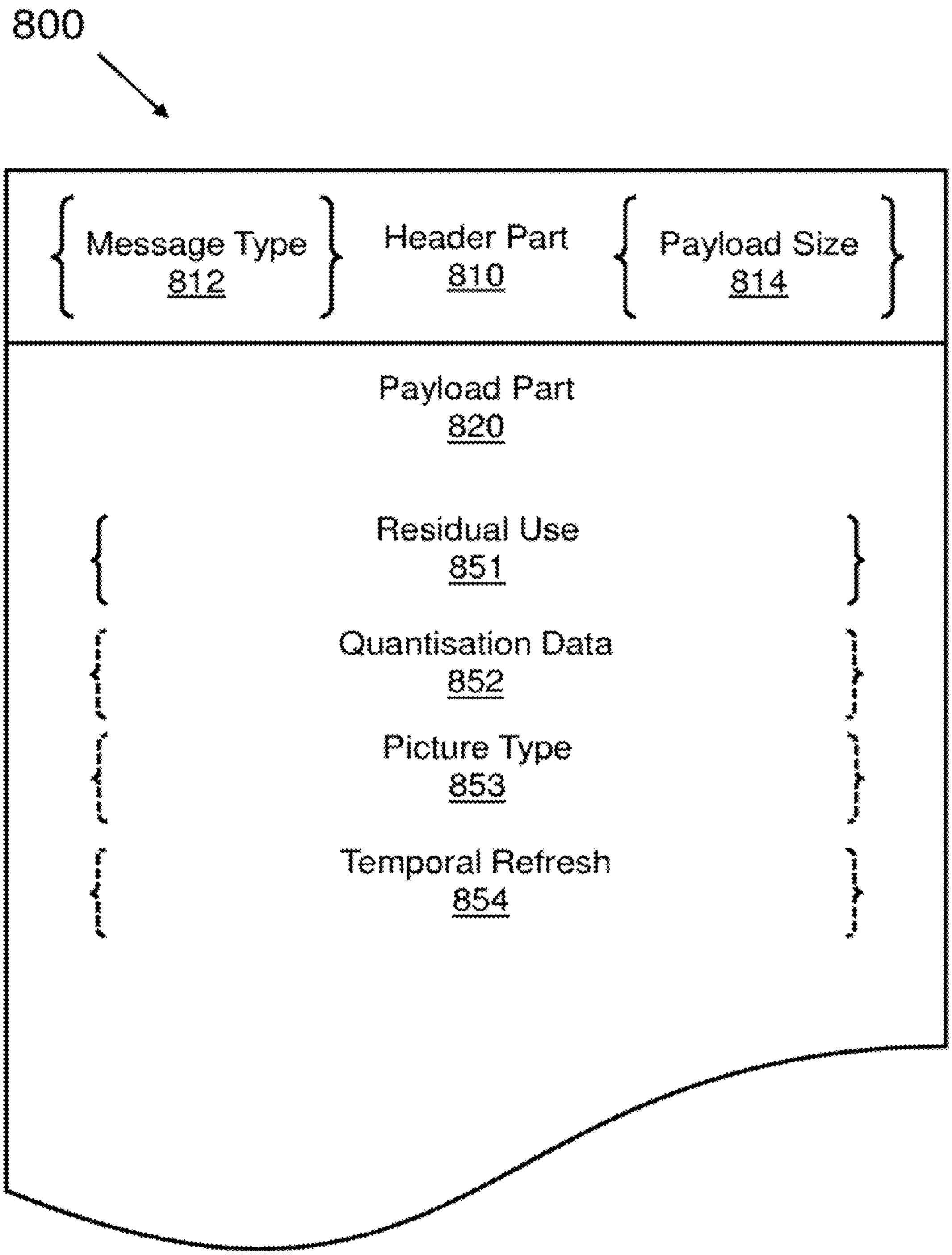
FIG. 8 shows a schematic diagram of another example of a configuration message in accordance with an embodiment of the present invention.

Referring to FIG. 8, there is shown schematically an example of a configuration message 800. The configuration message 800 may form part of configuration data 310. The configuration message 800 may be generated by encoder 108. Some items depicted in FIG. 8 are similar to items shown in FIG. 5. Corresponding reference signs, incremented by 300, have therefore been used for similar items.

Configuration message 800 is a more specific example of configuration message 500. The configuration message 800 comprises a header part 810 and a payload part 820. The header part 810 comprises a message type parameter 812 and a payload size parameter 814. The payload part 820 comprises a set of configuration parameters. The set of configuration parameters are related to processing of residual data 216. In some examples, the configuration message 800 is an integer number of bytes long.

The message type of the configuration message 800 is an image configuration message. An image configuration message may correspond to a given image only in a set of images. As such, a different image configuration message may be generated and/or output for each image in the set of images. The payload part 820 comprises a set of image configuration parameters.

In this example, the set of image configuration parameters comprises a residual use parameter 851. The value of the residual use parameter 851 specifies whether or not the input data 206 for a given image is to be reconstructed using the residual data 216 for the given image. If the input data 206 is to be reconstructed, a further set of configuration parameters is included in the image configuration message 800. If the input data 206 is not to be reconstructed, the further set of configuration parameters is not included in the image configuration message 800. Therefore, the further set of configuration parameters is included selectively. This is depicted using dashed lines in FIG. 8.

In this example, the value of the residual use parameter 851 indicates whether the further set of configuration parameters is included in the image configuration message 800. In this example, the value of the residual use parameter 851 can therefore indicate whether or not the further set of configuration parameters is included in the image configuration message 800. As such, the residual use parameter 851 may comprise a parameter presence indicator. The residual use parameter 851 is useable by the decoder 110 to detect whether or not the input data 206 is to be reconstructed using the residual data 216 and whether or not the further set of configuration parameters are included in the configuration message 800.

In some examples, when the further set of configuration parameters is included in the image configuration message 800, the payload part 820 of configuration message 800 is 5 bytes long. When the further set of configuration parameters is not included in the configuration message 800, the payload part 820 of configuration message 800 may be 1 byte long.

In this example, the set of image configuration parameters comprises quantisation data 852. The quantisation data 852 is comprised in the further set of configuration parameters whose inclusion is indicated by the residual use parameter 851. The quantisation data 852 is indicative of a quantisation level of data useable by the decoder 110 to reconstruct, for a given image, the input data 206 using the upsampled data 214.

Quantisation involves approximating a relatively large set of values by a relatively small set of values, for example by rounding, thresholding or truncating the values in the relatively large set. The objective of a quantisation operation is to reduce the amount of data in quantised output data compared to that in the input data to the quantisation operation. A quantisation level of given data may indicate how aggressively the given data is quantised. A quantisation level may be indicative of a granularity of quantised data obtained via the quantisation process. In another words, the quantisation level may be indicative of how much information is lost due to such quantisation. For example, a quantisation level may indicate one or more thresholds or bins for quantisation that indicate how data is quantised.

In some examples, the quantisation data 852 is indicative of a quantisation level of residual data 216. Therefore, the data useable by the decoder 216 to reconstruct the input data 206 may be data at the relatively high level of quality. The quantisation level may instruct the decoder 110 on how to perform an inverse quantisation upon already quantised residual data 216. For example, at the decoder 110, a received set of residual data 216 may have values in a first quantised range, that are then expanded to a larger range of values following inverse quantisation. The quantisation data 852 may be used to perform this operation.

In some examples, the quantisation data 852 is indicative of a quantisation level of correction data. For a given image, the correction data is useable to correct for errors in encoding and/or decoding the representation at the relatively low level of quality, as described with reference to FIG. 2 above. Therefore, the data useable by the decoder 110 to reconstruct the input data 206 may be data at the relatively low level of quality.

In some examples, the quantisation data 852 is indicative of a first quantisation level and a second quantisation level. The first quantisation level is a quantisation level applied to the residual data 216. The second quantisation level is a quantisation level applied to correction data. As such, both the residual data 216 and the correction data may be quantised using individually defined quantisation levels that are indicated by the quantisation data 852. The quantisation data 852 may thus comprise levels at which one or more of correction data and residual data were quantised at an encoder (e.g. following transformation as described herein), which are then sent to a decoder to allow inverse quantisation and reconstruction of original values associated with the correction data and residual data (the reconstructed values may not match the original values prior to quantisation at the encoder, due to information lost during the quantisation process).

The quantisation data 852 may comprise an integer number of bytes. In some examples, the quantisation data 852 comprises two bytes. In some examples, the quantisation data 852 comprises four bytes.

In this example, the set of image configuration parameters comprises a picture type parameter 853. The picture type parameter 853 is comprised in the further set of configuration parameters whose inclusion is indicated by the residual use parameter 851. The picture type parameter 853 specifies whether the given image corresponds to a frame or a field. In other words, the picture type parameter 853 indicates whether the given image is progressive, in which case picture type parameter 853 specifies a frame, or interlaced, in which case picture type parameter 853 specifics a field. In a case where the given image is interlaced, the picture type parameter 853 may also specify a field type, for example a top field or a bottom field. The picture type parameter 853 may have a bit-length of one or two bits.

In this example, the set of image configuration parameters comprises a temporal refresh parameter 854. The temporal refresh parameter 854 is comprised in the further set of configuration parameters whose inclusion is indicated by the residual use parameter 851. The temporal refresh parameter 854 is used to indicate when temporal data is to be refreshed. For example, the value of the temporal refresh parameter 854 may specify whether or not a buffer storing temporal data is to be cleared. For example, as described herein, residual data (or transformed residual data) for a current frame of video may be modified based on residual data (or transformed residual data) for a previous frame of video. The latter data may be stored in a buffer and used to modify the former data. This may be repeated in an iterative manner for each frame. In one case, at an encoder, a current set of data and the contents of the buffer may be compared, and a difference computed. At the decoder, temporal processing may comprise adding the contents of the buffer to received data to reconstruct residual or transformed residual data. In the present case, the value of the temporal refresh parameter 854 may indicate to the decoder that data relating to a previous frame that is stored in the buffer is to be cleared. This may effectively indicate that no temporal processing is to be applied (e.g. a value of 0 added to received data will not modify the received data). Temporal data comprises data useable in temporal processing, for example data that is based on multiple images. The bit-length of the value of the temporal refresh parameter 854 may be one bit.

The set of image configuration parameters may comprise more, fewer or different parameters than those described above with reference to FIG. 8.

The image configuration message 800 is output for a plurality of images in the set of images. In some examples, the number of images in the plurality of images is equal to the number of images in the set of images. In other words, the image configuration message 800 may be output for every image in the set of images. In other examples, the number of images in the plurality of images is less than the number of images in the set of images. The number of images in the plurality of images may be based on an optimization metric. The optimization metric may be a rate-distortion metric.

Image set configuration message 700 and image configuration message 800 may both be output for a given set of images. The number of times image set configuration message 700 is output for the set of images is less than the number of times image configuration message 800 is output for the set of images. For example image set configuration message 700 may be output only once for the set of images, and image configuration message 800 may be output for every image in the set of images. As such, image configuration message 800 is output more frequently than image set configuration message 700.

Outputting image configuration message 800 relatively frequently uses more data than outputting image configuration message 800 relatively infrequently. However, outputting image configuration message 800 relatively frequently provides the decoder 110 with up-to-date information that enables the decoder 110 to perform image reconstruction with a high degree of accuracy and/or reliability. The set of image configuration parameters stored in image configuration message 800 may change between different images, for example. There is thus a trade-off between an amount of data that is transmitted to the decoder 110 and an accuracy and/or reliability with which the decoder 110 can perform reconstruction using the data that is received. For image set configuration message 700 and image configuration message 800, the optimal outcome of such a trade-off is that image configuration message 800 is sent more frequently than image set configuration message 700. Sending image set configuration parameters with a relatively low frequency and sending image configuration parameters with a relatively high frequency may therefore reduce an amount of information that is sent over a given period of time whilst enabling the decoder 110 to perform reconstruction with a predetermined level of accuracy and/or reliability.

Figure 9:
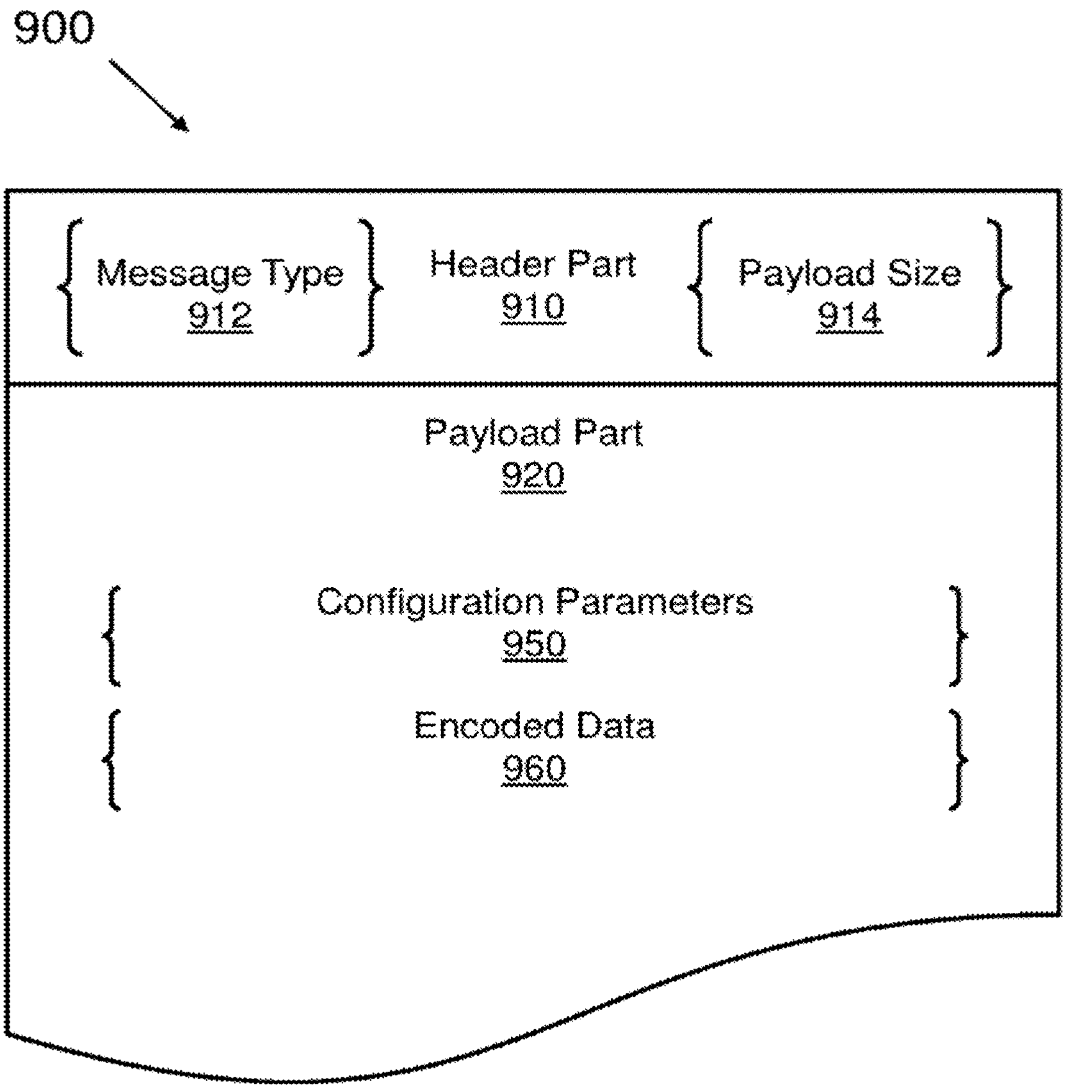
FIG. 9 shows a schematic diagram of another example of a configuration message in accordance with an embodiment of the present invention.

Referring to FIG. 9, there is shown schematically an example of a configuration message 900. The configuration message 900 may form part of configuration data 310. The configuration message 900 may be generated by encoder 108. Some items depicted in FIG. 9 are similar to items shown in FIG. 5.

Corresponding reference signs, incremented by 400, have therefore been used for similar items.

Configuration message 900 is a more specific example of configuration message 500. The configuration message 900 comprises a header part 910 and a payload part 920. The header part 910 comprises a message type parameter 912 and a payload size parameter 914. The payload part 920 comprises a set of configuration parameters. The set of configuration parameters are related to processing of residual data 216. In some examples, the configuration message 900 is an integer number of bytes long.

The message type of the configuration message 900 is an encoded data message. An encoded data message may correspond to a given image in a set of images. As such, a different encoded data message may be generated and/or output for each image in the set of images.

The payload part 920 comprises a set of configuration parameters 950. The payload part 920 may also comprise data 960 based on the residual data 216 for the given image. The data 960 based on the residual data 216 may comprise the residual data 216 itself. In some examples, the data 960 based on the residual data 216 comprises transformed residual data. Transformed residual data comprises data that is the output of a transformation operation performed on the residual data 216. The transformation operation may be a directional decomposition operation that exploits correlation between residual elements in the residual data 216.

In some examples, the data 960 based on the residual data 216 comprises encoded data. The encoded data may be encoded residual data or encoded transformed residual data. The encoded data may be derived using one or both of a run-length encoding operation and a Huffman encoding operation. As described above, the residual data or the transformed residual data may be quantised prior to encoding.

In some examples, the data 960 based on the residual data 216 is stored in one or more variable-length elements each comprising an integer number of bytes, as described above.

In this example, the set of configuration parameters 950 indicates whether the encoded data is derived using a Huffman encoding operation, a run-length encoding operation, or both. In some examples, the set of configuration parameters 950 indicates whether or not the encoded data is output for the given image. In some examples, the set of configuration parameters 950 relates to a size of the encoded data. For example, a configuration parameter may relate to a size of run-length encoded data and/or a size of Huffman encoded data.

The encoded data message 900 is output for a plurality of images in a set of images. In some examples, the number of images in the plurality of images is equal to the number of images in the set of images. In other words, the encoded data message 900 may be output for every image in the set of images. In other examples, the number of images in the plurality of images is less than the number of images in the set of images. The number of images in the plurality of images may be based on an optimization metric. The optimization metric may be a rate-distortion metric.

In some examples, the encoded data message 900 is generated and/or output selectively. Whether or not an encoded data message is generated and/or output for a given image may depend on whether the input data 206 for the given image is to be reconstructed using the residual data 216 for the given image. Whether or not the input data 206 for the given image is to be reconstructed may be indicated by the residual use parameter 851 of the corresponding image configuration message 800 for the given image. An amount of information that is transmitted may be reduced by outputting the encoded data message 900 selectively compared to a case in which the encoded data message 900 is not selectively output.

Configuration messages generated by the encoder 108 may have other message types than those described above. Another example message type is an encoder metadata message. An encoder metadata message comprises metadata relating to one or more encoder characteristics. Another example message type is a decoder control message. A decoder control message comprises instructions for controlling a decoder. A decoder control message may comprise a configuration parameter relating to image dithering. Another example message type is a research message. A research message comprises a custom payload for research purposes.

Figure 10:
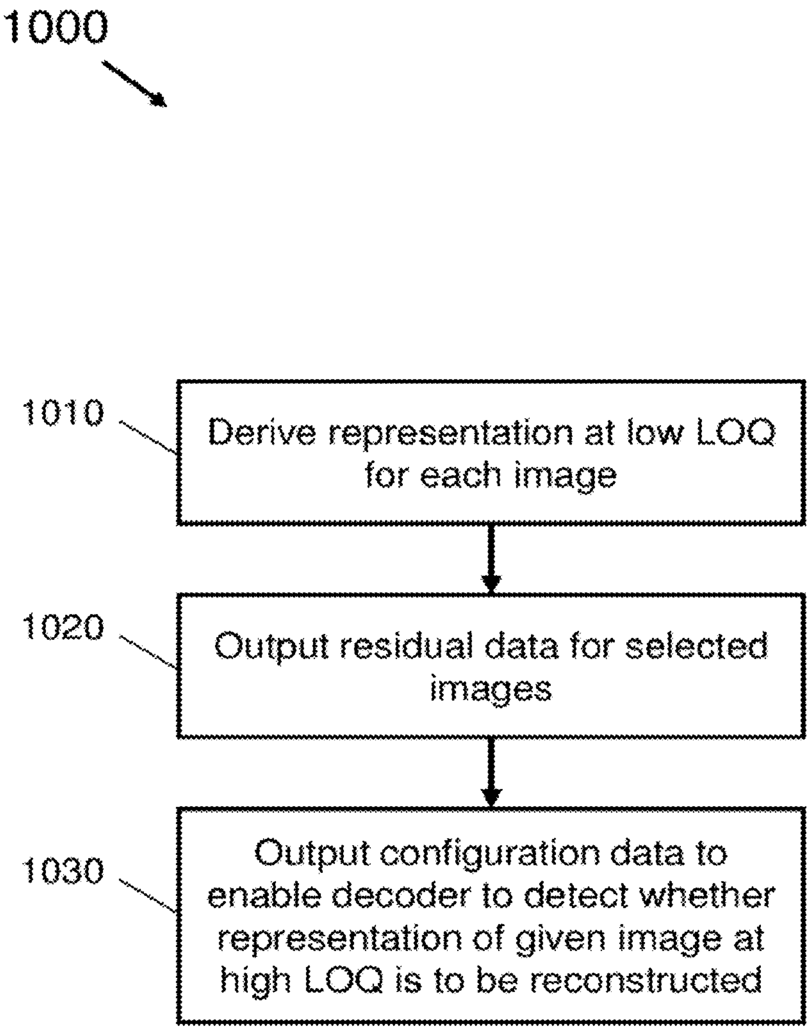
FIG. 10 is a flow diagram depicting an example of a method in accordance with an embodiment of the present invention.

Referring to FIG. 10, there is shown an example of a method 1000 of processing configuration data. The method 1000 may be performed by an apparatus comprising an encoder such as the first apparatus 102 described above.

At item 1010, for each image in a set of images, a representation of the image at the relatively low level of quality is derived using a first representation of the image at the relatively high level of quality. The representation at the relatively low level of quality is output for processing by the decoder 110.

At item 1020, residual data is output for one or more selected images in the set of images. The residual data is useable to reconstruct the first representation using a second representation of the image at the relatively high level of quality, the second representation being based on the representation of the image at a relatively low level of quality. The residual data is derived based on the first representation and the second representation.

In some examples, the one or more selected images comprises all of the images in the set of images. In some examples, the one or more selected images are selected based on image content. For example, if the first representation of a first image contains a relatively large amount of visual detail, it may be determined that residual data for the first image is to be used and/or output to enable the first representation of the first image to be reconstructed. Contrastingly, if the first representation of a second image contains relatively little visual detail, for example if the second image corresponds to a "black screen", it may be determined that residual data for the second image is not to be used and/or output. Using residual data to reconstruct the first representation of the second image may not substantially improve the displayed visual quality for the second image, due to the lack of visual detail contained therein. Using and/or outputting residual data selectively may reduce an amount of information that is transmitted and/or processed over a given period of time compared with not selectively using and/or outputting residual data.

At item 1030, configuration data is output for processing by the decoder 110. The configuration data enables the decoder 110 to detect whether the first representation of a given image in the set of images is to be reconstructed using residual data for the given image. The given image may be comprised in the one or more selected images. The configuration data may be output for each image in the set of images. The configuration data may comprise image configuration message 800. The configuration data may, for example comprise the residual use parameter 851. In some examples, the configuration data comprises encoded data message 900.

In some examples, the number of times the configuration data is output for the set of images is less than the number of images in the set of images. The configuration data may correspond to multiple images in the set of images. The configuration data may comprise image set configuration message 700, for example. In some examples, the number of times the configuration data is output for the set of images is based on an optimization metric.

Figure 11:
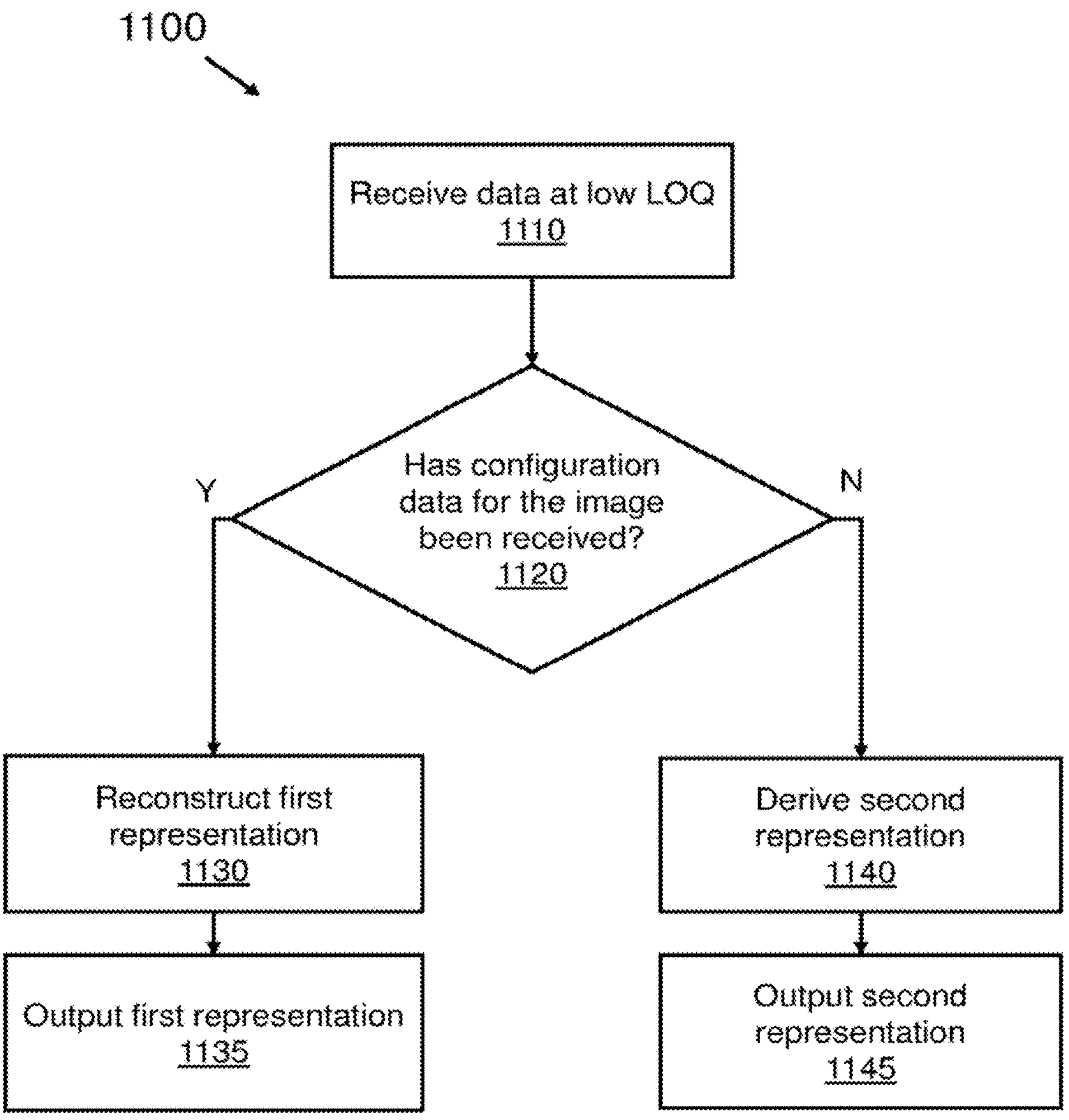
FIG. 11 is a flow diagram depicting another example of a method in accordance with an embodiment of the present invention.

Referring to FIG. 11, there is shown an example of a method 1100 for use in processing representations of an image. The method 1100 may be performed by the decoder 110 described above.

At item 1110, data is received that is useable to derive a representation of an image at the relatively low level of quality. Prior to receipt by the decoder 110, the representation at the relatively low level of quality is derived by encoder 108 using a first representation of the image at the relatively high level of quality. In some examples, the image is one of a set of images. The set of images may be part of a video signal. In some examples, the received data is processed to obtain the representation at the relatively low level of quality. For example, the received data may be decoded to obtain the representation at the relatively low level of quality.

At item 1120, it is determined whether predetermined configuration data has been received. The predetermined configuration data corresponds to the image.

If it is determined at item 1120 that the predetermined configuration data corresponding to the image has been received, the first representation of the image is reconstructed at item 1130. The first representation is reconstructed using the predetermined configuration data. The first representation is reconstructed using a second representation of the image at the relatively high level of quality. In some examples, the representation at the relatively low level of quality is processed to derive the second representation. For example, the second representation may be derived by upsampling the representation at the relatively low level of quality. The first representation may be reconstructed by combining the second representation with the residual data.

At item 1135, the first representation is output. For example, the first representation may be output for display by a display device.

If it is determined at item 1120 that the predetermined configuration data corresponding to the image has not been received, the first representation is not reconstructed. Instead, the representation at the relatively low level of quality is processed at item 1140 to derive the second representation. The second representation may be derived by upsampling the representation at the relatively low level of quality.

At item 1145, the second representation is output. For example, the second representation may be output for display by the display device.

In some examples, if it is determined that the predetermined configuration data corresponding to the image has not been received, the second representation is not derived. For example, the representation at the relatively low level of quality may be output instead of the second representation. In some examples, data based on the representation at the relatively low level of quality is output. The data based on the representation at the relatively low level of quality is different from the first representation and the second representation.

In a case where the image is one of a set of images, the predetermined configuration data may correspond to multiple images in the set of images. The predetermined configuration data may not be received with every image in the set of images. In one example, the predetermined configuration data is received with the first image only in the set of images. The predetermined configuration data may be applicable to every subsequent image in the set of images. As such, if the first image in the set of images is not received by the decoder 110, the predetermined configuration data for the set of images may also not be received. The predetermined configuration data may be image set configuration data. The predetermined configuration data may comprise image set configuration message 700.

In a case where the set of images are part of a streamed video, the decoder may enter the video stream partway through the set of images. In such a case, although the first representation is not reconstructed due to the absence of receipt of the predetermined configuration data, a representation at the relatively high level of quality, namely the second representation, may still be output. Outputting the second representation for display reduces a potential loss in visual quality caused by the absence of receipt of the predetermined configuration data compared to a case in which a representation at the relatively high level of quality is not output. Outputting the second representation may be considered part of a "minimum operation mode", in contrast to outputting the first representation, which may be considered part of a "full operation mode". In the case where the decoder 110 enters the video stream partway through the set of images, the "minimum operation mode" may be used for the remainder of the set of images. When the first image in a following set of images is then received, the predetermined configuration data for the following set of images is also received. As such, the following set of images may be processed according to the "full operation mode".

Figure 12:
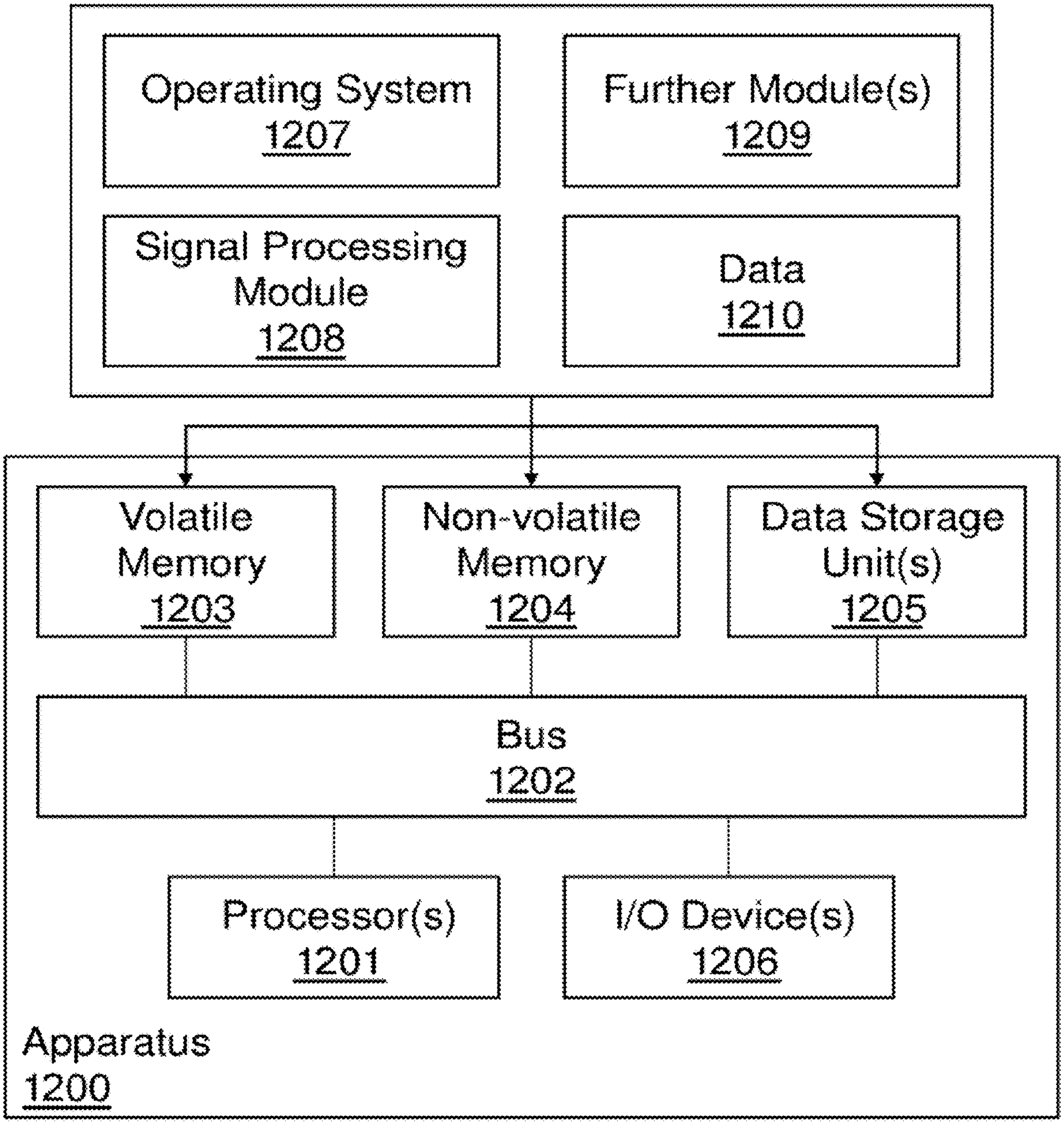
FIG. 12 shows a schematic block diagram of an example of an apparatus in accordance with an embodiment of the present invention.

Referring to FIG. 12, there is shown a schematic block diagram of an example of an apparatus 1200.

In an example, the apparatus 1200 comprises an encoder. In another example, the apparatus 1200 comprises a decoder.

Examples of apparatus 1200 include, but are not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, mobile device, video game console, handheld video game device, or in general any type of computing or electronic device.

In this example, the apparatus 1200 comprises one or more processors 1201 configured to process information and/or instructions. The one or more processors 1201 may comprise a central processing unit (CPU). The one or more processors 1201 are coupled with a bus 1202. Operations performed by the one or more processors 1201 may be carried out by hardware and/or software. The one or more processors 1201 may comprise multiple co-located processors or multiple disparately located processors.

In this example, the apparatus 1200 comprises computer-useable volatile memory 1203 configured to store information and/or instructions for the one or more processors 1201. The computer-useable volatile memory 1203 is coupled with the bus 1202. The computer-useable volatile memory 1203 may comprise random access memory (RAM).

In this example, the apparatus 1200 comprises computer-useable non-volatile memory 1204 configured to store information and/or instructions for the one or more processors 1201. The computer-useable non-volatile memory 1204 is coupled with the bus 1202. The computer-useable non-volatile memory 1204 may comprise read-only memory (ROM).

In this example, the apparatus 1200 comprises one or more data-storage units 1205 configured to store information and/or instructions. The one or more data-storage units 1205 are coupled with the bus 1202. The one or more data-storage units 1205 may for example comprise a magnetic or optical disk and disk drive or a solid-state drive (SSD).

In this example, the apparatus 1200 comprises one or more input/output (I/O) devices 1206 configured to communicate information to and/or from the one or more processors 1201. The one or more I/O devices 1206 are coupled with the bus 1202. The one or more I/O devices 1206 may comprise at least one network interface. The at least one network interface may enable the apparatus 1200 to communicate via one or more data communications networks. Examples of data communications networks include, but are not limited to, the Internet and a Local Area Network (LAN). The one or more I/O devices 1206 may enable a user to provide input to the apparatus 1200 via one or more input devices (not shown). The one or more input devices may include for example a remote control, one or more physical buttons etc. The one or more I/O devices 1206 may enable information to be provided to a user via one or more output devices (not shown). The one or more output devices may for example include a display screen.

Various other entities are depicted for the apparatus 1200. For example, when present, an operating system 1207, data signal processing module 1208, one or more further modules 1209, and data 1210 are shown as residing in one, or a combination, of the computer-usable volatile memory 1203, computer-usable non-volatile memory 1204 and the one or more data-storage units 1205. The data signal processing module 1208 may be implemented by way of computer program code stored in memory locations within the computer-usable non-volatile memory 1204, computer-readable storage media within the one or more data-storage units 1205 and/or other tangible computer-readable storage media. Examples of tangible computer-readable storage media include, but are not limited to, an optical medium (e.g., CD-ROM, DVD-ROM or Blu-ray), flash memory card, floppy or hard disk or any other medium capable of storing computer-readable instructions such as firmware or microcode in at least one ROM or RAM or Programmable ROM (PROM) chips or as an Application Specific Integrated Circuit (ASIC).

The apparatus 1200 may therefore comprise a data signal processing module 1208 which can be executed by the one or more processors 1201. The data signal processing module 1208 can be configured to include instructions to implement at least some of the operations described herein. During operation, the one or more processors 1201 launch, run, execute, interpret or otherwise perform the instructions in the signal processing module 1208.

Although at least some aspects of the examples described herein with reference to the drawings comprise computer processes performed in processing systems or processors, examples described herein also extend to computer programs, for example computer programs on or in a carrier, adapted for putting the examples into practice. The carrier may be any entity or device capable of carrying the program.

It will be appreciated that the apparatus 1200 may comprise more, fewer and/or different components from those depicted in FIG. 12.

The apparatus 1200 may be located in a single location or may be distributed in multiple locations. Such locations may be local or remote.

The techniques described herein may be implemented in software or hardware, or may be implemented using a combination of software and hardware. They may include configuring an apparatus to carry out and/or support any or all of techniques described herein.

Examples described herein relate to a syntax for the use of configuration data relating to processing of residual data, the residual data being useable in image reconstruction. The syntax provides a processing framework to enable an encoder to obtain and output configuration data and to enable a decoder to receive and process the configuration data. The syntax framework facilitates the generation and processing of configuration messages such as those described above. A decoder uses received configuration data to reconstruct representations of images, for example that are part of a video stream, at a high level of quality. The syntax framework described herein allows the decoder to perform such reconstruction with a relatively high degree of efficiency, reliability and accuracy.

The syntax framework described herein enables an overhead cost of transmitted data to be reduced compared to some known systems. The syntax framework described herein may involve an overhead of at most 3 bytes for a given image when residual data is not to be used to reconstruct the representation of the given image at the high level of quality. When residual data is to be used to reconstruct the representation at the high level of quality, an overhead cost of at most 43 bytes for the given image may be involved. This is in contrast to some known systems, which may involve an overhead cost per image of between 108 and 188 bytes. As such, an amount of information that is generated, stored, processed and/or transmitted over a given period of time is significantly reduced through the use of the syntax framework described herein.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method comprising:

generating an image configuration message comprising a header part and a payload part, the payload part comprising a set of image configuration parameters, the set of image configuration parameters relating to the processing of residual data and which enables a decoder to perform image reconstruction with a predetermined degree of accuracy, wherein the set of image configuration parameters comprises a residual use parameter, and wherein a value of the residual use parameter specifies whether or not input data for the given image is to be reconstructed using residual data for the given image;

outputting the image configuration message, wherein the image configuration message corresponds to a given image only in a set of images.

2. The method according to claim 1, wherein the set of image configuration parameters comprises quantization data indicative of a quantization level of data useable reconstruct, for the given image, the input data using upsampled data.

3. The method according to claim 1, wherein the set of image configuration parameters comprises a picture type parameter that specifies whether the given image is progressive or interlaced.

4. The method according to claim 1, comprising generating and/or outputting a different image configuration message for each image in the set of images.

5. A method comprising:

receiving an image configuration message comprising a header part and a payload part, the payload part comprising a set of image configuration parameters, the set of image configuration parameters relating to the processing of residual data and which enables a decoder to perform image reconstruction with a predetermined degree of accuracy, wherein the set of image configuration parameters comprises a residual use parameter, wherein a value of the residual use parameter specifies whether or not input data for the given image is to be reconstructed using residual data for the given image;

performing image reconstruction using the received image configuration message, wherein the image configuration message corresponds to a given image only in a set of images.

6. The method according to claim 5, wherein the set of image configuration parameters comprises quantization data indicative of a quantization level of data useable reconstruct, for the given image, the input data using upsampled data.

7. The method according to claim 6, wherein the set of image configuration parameters comprises a picture type parameter that specifies whether the given image is progressive or interlaced.

8. The method according to any of claim 5, comprising receiving a different image configuration message for each image in the set of images.

9. An apparatus configured to:

receive an image configuration message comprising a header part and a payload part, the payload part comprising a set of image configuration parameters, the set of image configuration parameters relating to the processing of residual data and which enables a decoder to perform image reconstruction with a predetermined degree of accuracy, wherein the set of image configuration parameters comprises a residual use parameter, wherein a value of the residual use parameter specifies whether or not input data for the given image is to be reconstructed using residual data for the given image; and perform image reconstruction using the received image configuration message, wherein the image configuration message corresponds to a given image only in a set of images.

10. The apparatus according to claim 9, wherein the set of image configuration parameters comprises quantization data indicative of a quantization level of data useable reconstruct, for the given image, the input data using upsampled data.

11. The apparatus according to claim 10, wherein the set of image configuration parameters comprises a picture type parameter that specifies whether the given image is progressive or interlaced.

12. The apparatus according to any of claim 9, the apparatus further configured to receive a different image configuration message for each image in the set of images.

* * * * *